(12) United States Patent
Sentieri et al.

(10) Patent No.: US 12,555,600 B2
(45) Date of Patent: *Feb. 17, 2026

(54) SYSTEM AND METHOD FOR DISK DRIVE FLY HEIGHT MEASUREMENT

(71) Applicant: STMicroelectronics International N.V., Geneva (CH)

(72) Inventors: Enrico Sentieri, Lodi (IT); Paolo Pulici, Lainate (IT); Enrico Mammei, Vittuone (IT); Michele Bartolini, Carpiano (IT); Matteo Tonelli, Parma (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/928,940

(22) Filed: Oct. 28, 2024

(65) Prior Publication Data

US 2025/0201271 A1 Jun. 19, 2025

Related U.S. Application Data

(63) Continuation of application No. 18/538,724, filed on Dec. 13, 2023, now Pat. No. 12,165,680.

(51) Int. Cl.
*G11B 5/60* (2006.01)
(52) U.S. Cl.
CPC ............ *G11B 5/6017* (2013.01); *G11B 5/607* (2013.01)

(58) Field of Classification Search
None
See application file for complete search history.

(56) References Cited

U.S. PATENT DOCUMENTS

| | | |
|---|---|---|
| 7,256,957 B1 | 8/2007 | Rahgozar |
| 7,375,912 B2 | 5/2008 | Brannon et al. |
| 7,394,611 B1 | 7/2008 | Rahgozar |
| 7,450,333 B2 | 11/2008 | Hirano et al. |
| 7,623,315 B1 | 11/2009 | Rahgozar |
| 8,139,310 B1 | 3/2012 | Hogg |
| 8,279,550 B1 | 10/2012 | Hogg |
| 8,320,069 B1 | 11/2012 | Knigge et al. |
| 8,582,231 B1 | 11/2013 | Kermiche et al. |
| 8,611,035 B1 | 12/2013 | Bajikar et al. |
| 8,824,091 B2 | 9/2014 | Contreras et al. |
| 8,837,076 B1 | 9/2014 | Cheng et al. |
| 9,001,453 B1 | 4/2015 | Knigge et al. |
| 9,053,730 B1 | 6/2015 | Hogg |
| 9,160,270 B2 * | 10/2015 | Miura .................... G11B 19/28 |

(Continued)

*Primary Examiner* — Fred Tzeng
(74) *Attorney, Agent, or Firm* — Slater Matsil, LLP

(57) ABSTRACT

A method for determining a fly height includes measuring a first differential voltage between a first head of a disk drive and a reference voltage with a first front end circuit, converting the first differential voltage to a first analog current signal with the first front end circuit, and converting the first analog current signal to a second differential voltage with a first back end circuit. The first front end circuit is coupled with the first head. The first back end circuit is coupled with the first front end circuit. The method further includes determining a first capacitance between the first head and a first disk of the disk drive based on the second differential voltage and determining the fly height between the first head and the first disk using the first capacitance.

20 Claims, 24 Drawing Sheets

(56) References Cited

U.S. PATENT DOCUMENTS

| | | | |
|---|---|---|---|
| 9,183,864 B1 | 11/2015 | Haralson et al. | |
| 11,295,774 B1 | 4/2022 | Xiao | |
| 11,756,582 B1* | 9/2023 | Pulici | G11B 5/6017 |
| | | | 360/78.04 |
| 12,165,680 B1* | 12/2024 | Sentieri | G11B 5/607 |
| 12,170,103 B2* | 12/2024 | Pulici | G11B 5/607 |
| 2006/0268445 A1 | 11/2006 | Brannon et al. | |
| 2007/0075688 A1 | 4/2007 | Aemireddy et al. | |
| 2008/0266702 A1* | 10/2008 | Bliss | G11B 5/6005 |
| 2012/0099218 A1 | 4/2012 | Kurita et al. | |
| 2012/0105998 A1 | 5/2012 | Shibano | |
| 2013/0083430 A1 | 4/2013 | Chiu et al. | |
| 2013/0301158 A1 | 11/2013 | Hogg | |
| 2014/0185158 A1 | 7/2014 | Li et al. | |
| 2019/0190448 A1 | 6/2019 | Haneda et al. | |
| 2020/0202894 A1 | 6/2020 | Inoue et al. | |
| 2024/0005956 A1 | 1/2024 | Pulici et al. | |
| 2025/0069623 A1* | 2/2025 | Pulici | G11B 5/607 |

* cited by examiner

SYSTEM AND METHOD FOR DISK DRIVE FLY HEIGHT MEASUREMENT

PRIORITY CLAIM AND CROSS-REFERENCE

This application is a continuation of U.S. patent application Ser. No. 18/538,724, filed on Dec. 13, 2023, now U.S. Pat. No. 12,165,680 issued on Dec. 10, 2024, entitled "System and Method for Disk Drive Fly Height Measurement," which application is incorporated herein by reference.

TECHNICAL FIELD

The present invention relates generally to disk drives, and, in particular embodiments, to systems and methods for measuring fly height distance of a disk drive head over a disk.

BACKGROUND

Generally, hard disk drives (also referred to as hard disks, hard drives, or fixed disks) record data on disks (also referred to as platters) by magnetizing a thin film of ferromagnetic material on the thin disk. The disks are flat, circular platters of a non-magnetic material such as glass, aluminum, or the like. The film is magnetized by disk drive heads (also referred to as read-and-write heads, or heads) that are moved into close proximity with each respective disk. The heads perform read operations and write operations on the thin films of ferromagnetic material on the disks. It is advantageous for the heads to have a very small distance from the top surface of the disk (referred to as a fly height distance) in order to reduce errors in read and write operations. However, too small of a fly height distance results in the heads physically contacting the disks while the hard disk drive is spinning the disks, which causes catastrophic damage to the disks. As such, systems and methods for measuring the fly height distance with increased accuracy are desirable.

FIG. 1 illustrates a cross-sectional view of an example system 50 of a head 10 over a disk 30. The disk 30 has a ferromagnetic film 32 covering a surface facing the head 10. The film 32 includes a plurality of magnetic regions 34 (illustrated as boxes with up and down arrows in FIG. 1), each of which includes a few hundred magnetic grains. Each magnetic region 34 has a polarity in an up direction or a down direction in order to encode data in a binary format.

The head 10 includes a reader element 12 to perform read operations on the magnetic regions 34 and a writer element 20 to perform write operations on the magnetic regions 34. The head 10 is mounted at a distance $D_1$ from the top surface of the disk 30 in a range of 10 nm to 20 nm. The disk 30 is rotated (e.g., at speeds in a range of 4,000 RPM to 16,000 RPM) while the head 10 is moved to an appropriate radial distance to perform the read or write operations on the magnetic regions 34. The reader element 12 is disposed between a first shield 14 and a second shield 16. The reader element 12 detects the grain orientations of the magnetic regions to determine the polarity of the magnetic regions, which encode binary values of 0 or 1.

The writer element 20 is an electromagnet made from a magnetizable material (e.g., ferrite or permalloy) that becomes magnetized in the presence of a magnetic field. When a current is passed through a coil 22 (e.g., a wire, as shown in cross-section in FIG. 1), a strong magnetic field is formed between opposite sides of the writer element 20. The magnetic field of the writer element 20 then acts on the magnetic regions 34 of the disk 30 to align them with a desired polarity, thus writing bits of data to the disk 30.

As the magnetic regions 34 are very small (e.g., with respective lengths of about 10 nm and respective widths of about 40 nm) and the writer element 20 is of similar size to the magnetic regions 34 (e.g., with a length and width of about 40 nm), it is advantageous for the writer element 20 to be moved to a distance $D_2$ from the surface of the disk 30 that is smaller than the distance $D_1$. For example, a distance $D_2$ of 1 nm allows for more accurate interaction between the magnetic field of the writer element 20 and the targeted magnetic region 34. A larger distance $D_2$ results in neighboring magnetic regions 34 being affected by the magnetic field of the writer element 20, leading to write errors on the disk 30.

The distance $D_2$ is achieved by heating the writer element 20 with a thermal element 24 (e.g., a coil). This distorts the profile of the portion of the head 10 around the writer element 20, decreasing the distance between the head 10 and the disk 30 from the distance $D_1$ to the distance $D_2$. This increases the performance of the writer element 20 and decreases write errors by allowing the magnetic field of the writer element 20 to accurately saturate the targeted magnetic regions 34. In this figure, the fly height adjustment of the head by use of the heater element is exaggerated by the downward bulge in a normally flat head surface.

The distance $D_2$ that the head 10 is held above the disk 30 while the disk 30 is rotating is also referred to as the fly height. Measuring the fly height accurately is critical to hard disk drive performance. A fly height that is too large (e.g., greater than 3 nm) increases read and write errors, but a fly height that is too small (e.g., smaller than 0.5 nm) increases the probability of a catastrophic head crash. This occurs when the head 10 makes physical contact with the disk 30 while the disk 30 is rotating at high speed, creating severe scratches and permanent damage to the film 32.

SUMMARY

In accordance with an embodiment, a system for determining a fly height includes: a first head of a disk drive, the first head being adjacent to a first disk; a first front end circuit coupled to the first head, the first front end circuit being configured to: determine a first differential voltage between the first head and a reference voltage; and convert the first differential voltage to a first analog current signal; a first back end circuit coupled to the first front end circuit, the first back end circuit being configured to: convert the first analog current signal to a second differential voltage; and measure a first capacitance between the first head and the first disk using the second differential voltage; and a logic device coupled to the first back end circuit, the logic device being configured to determine the fly height between the first head and the first disk using the measurement of the first capacitance.

In accordance with another embodiment, a system for determining a fly height includes: a first head of a disk drive, the first head being adjacent to a first disk; a second head of the disk drive, the second head being adjacent to a second disk; a first front end circuit coupled to the first head, the first front end circuit being configured to: determine a first differential voltage between the first head and a reference voltage; and convert the first differential voltage to a first analog current signal; a second front end circuit coupled to the second head, the second front end circuit being configured to: determine a second differential voltage between the second head and the reference voltage; and convert the second differential voltage to a second analog current signal; a first back end circuit coupled to the first front end circuit, the first back end circuit being configured to: convert the first analog current signal to a third differential voltage; and measure a first capacitance between the first head and the first disk using the third differential voltage; a second back end circuit coupled to the second front end circuit, the second back end circuit being configured to: convert the second analog current signal to a fourth differential voltage; and measure a second capacitance between the second head and the second disk using the fourth differential voltage; and a logic device coupled to the first back end circuit and the second back end circuit, the logic device being configured to: correct a measurement of the first capacitance using a measurement of the second capacitance; and determine the fly height between the first head and the first disk using the corrected measurement of the first capacitance.

In accordance with yet another embodiment, a method for determining a fly height includes: measuring a first differential voltage between a first head of a disk drive and a reference voltage with a first front end circuit, the first front end circuit being coupled with the first head; converting the first differential voltage to a first analog current signal with the first front end circuit; converting the first analog current signal to a second differential voltage with a first back end circuit, the first back end circuit being coupled with the first front end circuit; determining a first capacitance between the first head and a first disk of the disk drive based on the second differential voltage; and determining the fly height between the first head and the first disk using the first capacitance.

It is to be understood that both the foregoing general description and the following detailed description are exemplary and explanatory only and are not restrictive of the disclosure, as claimed.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments. The references used herein are provided merely for convenience and hence do not define the extent of protection or the scope of the embodiments.

Current techniques to measure the fly height of a head over a disk include using thermal sensors to detect very small changes in thermal conductivity as the head approaches the disk. However, using thermal conductivity to measure fly height is often unreliable, and more accurate methods of measuring the fly height are desirable.

Figure 1:
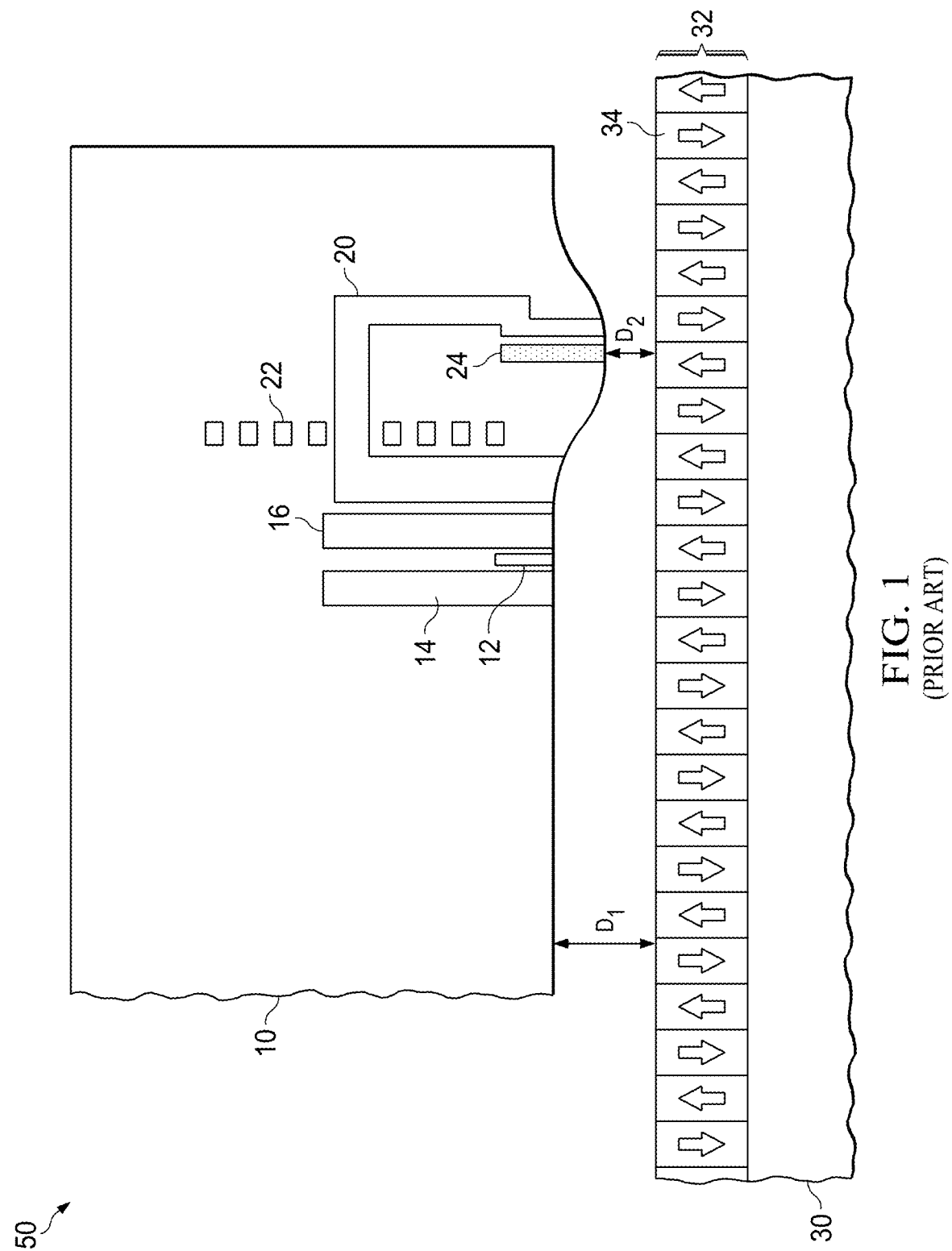
FIG. 1 illustrates a cross-sectional view of an example system of a disk drive head over a disk.

It is appreciated that the system 50 of FIG. 1 is a non-limiting example presented to illustrate the problem of fly height measurement identified by the inventors. Hard disk drives and other systems benefitting from accurate fly height measurement as discussed in this application may have any suitable configuration and are not limited to the structures shown in FIG. 1.

According to one or more embodiments of the present disclosure, this application relates to methods of decreasing the effect of ground bounce and thermal drift on measuring a fly height distance of a selected hard disk drive head over a disk with a capacitive sensor.

Embodiments of the disclosure are described in the context of the accompanying drawings. An embodiment of a hard disk drive head apparatus having a plurality of heads will be described using FIGS. 2A-2D. A system for a capacitive fly height sensor with ground sensing will be described using FIG. 3. A system for a capacitive fly height sensor with ground sensing using a differential approach will be described using FIG. 4. A system incorporating two capacitive fly height sensors will be described using FIG. 5. A system incorporating two capacitive fly height sensors, each having an oscillator circuit and each having a ground bounce sensing circuit, will be described using FIG. 6. A system incorporating two capacitive fly height sensors, each having a respective oscillator circuit and both sharing a common ground bounce sensing circuit, will be described using FIG. 7. An embodiment method for operating a disk drive using the systems of FIG. 3, 4, 5, 6, or 7 will be discussed with FIG. 8. Systems comprising switches between reference sensor circuits and disk drive heads will be described using FIGS. 9-11. Systems for capacitive fly height measurement comprising built-in self-test functionality will be described using FIGS. 12-14. An embodiment method for testing a circuit using the systems of FIGS. 12-14 will be discussed with FIG. 15. Systems for capacitive fly height measurement comprising current mode interconnects will be described using FIGS. 16-20. An embodiment method for determining a fly height using the system(s) of FIGS. 16-20 will be discussed with FIG. 21.

The fly height of a disk drive head over a disk may be measured using the property of capacitance rather than the property of thermal conductivity. The fly height can be determined by measuring the capacitance of a capacitor formed by the hard disk drive head with the disk. The capacitance will be inversely proportional to the distance between the head and the disk and the distance can be found by a precise measurement of the capacitance. However, using the capacitance to determine the fly height presents additional challenges, including degradation from ground noise, variation of capacitive sensor performance versus temperature (also referred to as thermal drift), and spin speed error. Embodiments of the disclosure address the ground noise and thermal drift by using a second hard disk drive head to compensate for the ground noise and thermal drift.

Transmitting differential voltage signals from front end circuits coupled with disk drive heads to back end circuits measuring head capacitance may lead to issues such as long and dense routing and/or high area usage for routing. Long and dense routing through the apparatus may be prone to coupling between analog and digital signals and frequency pulling between nearby oscillators. As such, it is advantageous to transmit analog signals from front end (FE) circuits to back end (BE) circuits in current rather than voltage.

Embodiments of the disclosure include current mode interconnects for capacitive fly height sensors. The current mode interconnects include front end circuits and back end circuits configured to transmit analog signals in current. This may be advantageous for reducing amplitude of voltage excursion on traces, thereby reducing coupling between traces. Differential analog signals are implemented in the front end circuits, which may reduce susceptibility to noise coupling in comparison with single-ended analog signals. Demultiplexing is implemented in the front end circuits to reduce the number of traces and analog signals to be transmitted to the back end circuits and to reduce coupling between traces. Reducing the number of traces may simplify routing and thereby save area. Reducing coupling between traces may be advantageous by improving the isolation between oscillators in the back end circuits (in other words, it may reduce frequency pulling between oscillators).

Figure 2A:
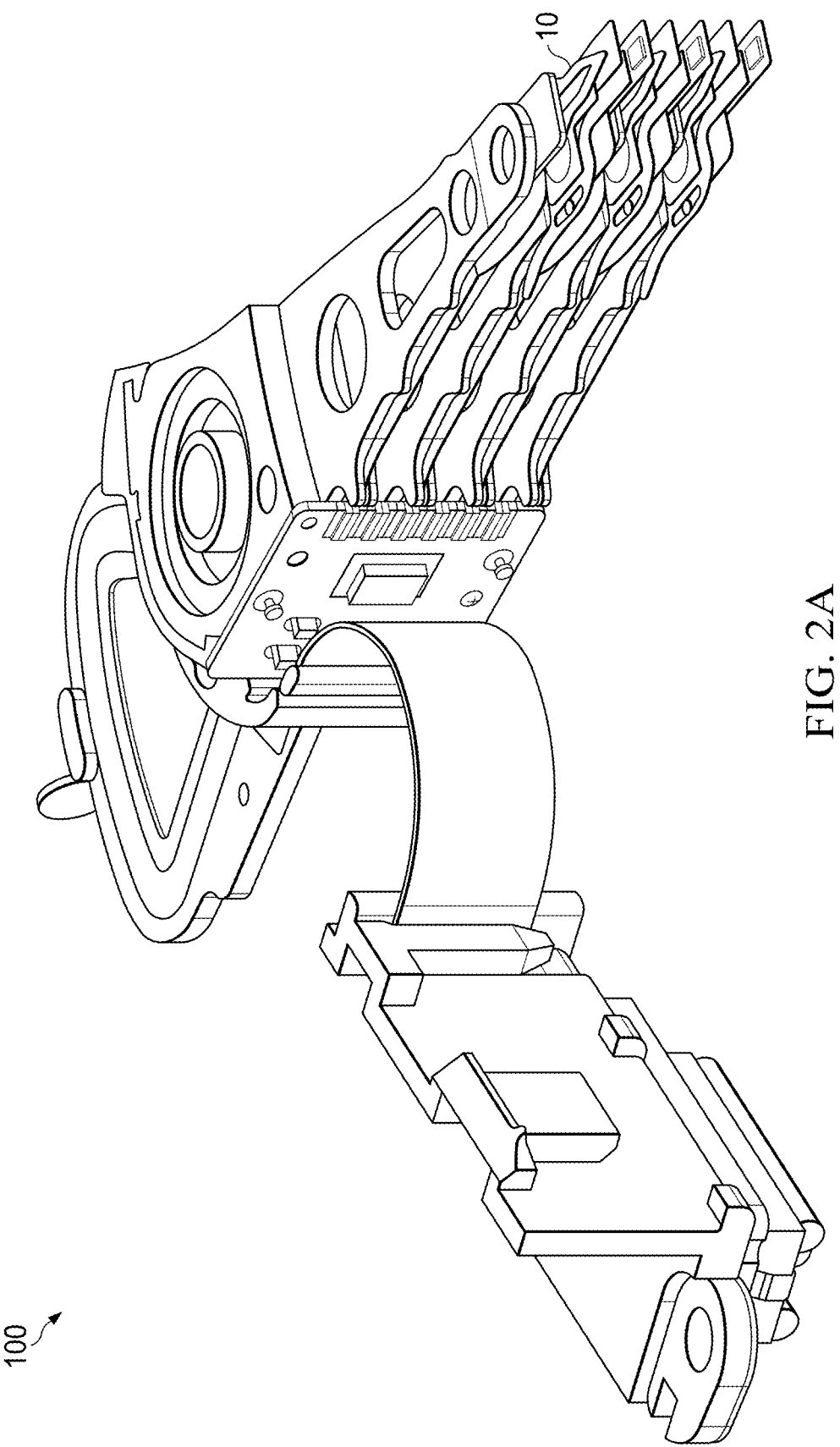
FIG. 2A illustrates a perspective view of a hard disk drive head apparatus having a plurality of heads, in accordance with some embodiments.
Figure 2B:
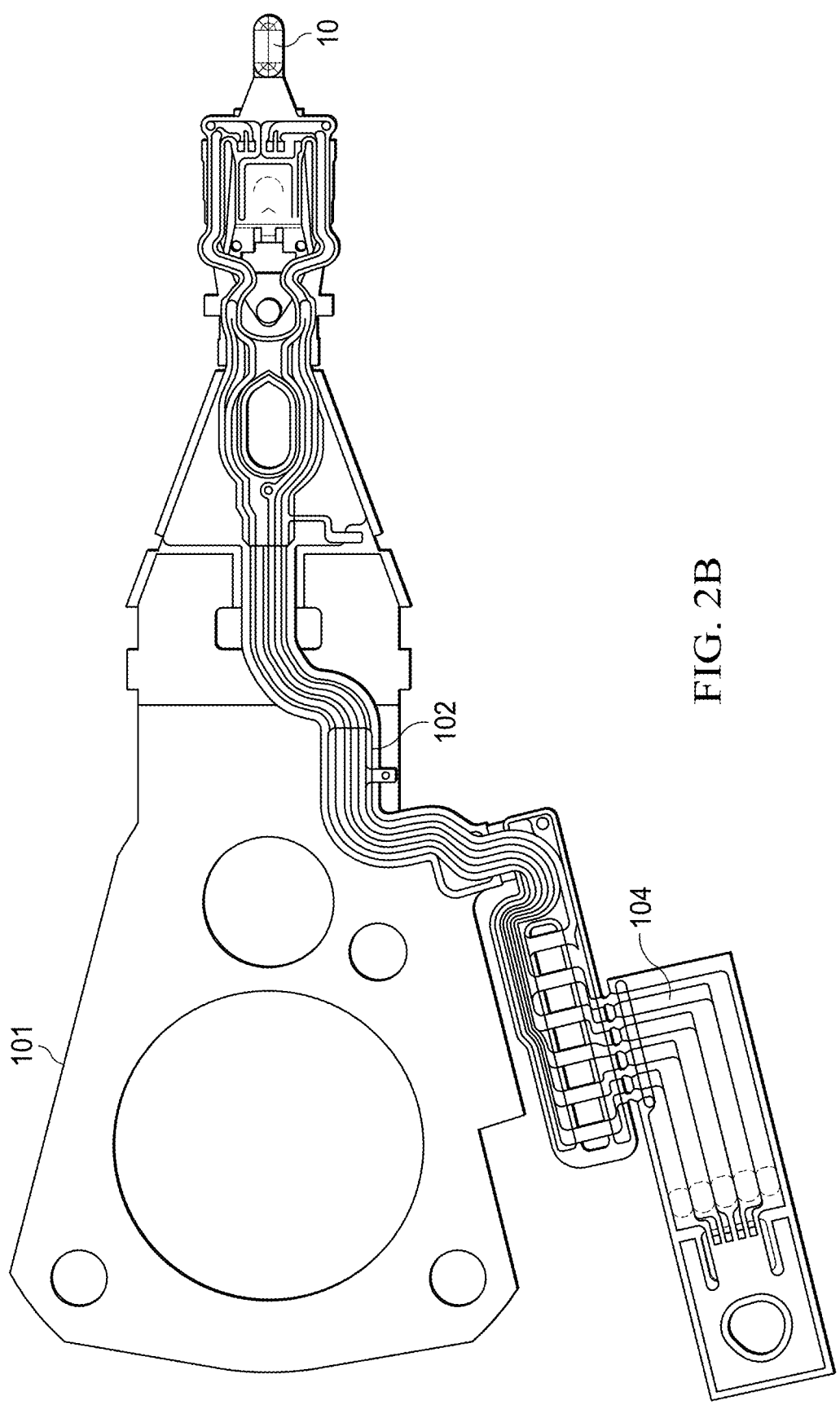
FIG. 2B illustrates a head mounted to a suspension assembly, in accordance with some embodiments.
Figure 2C:
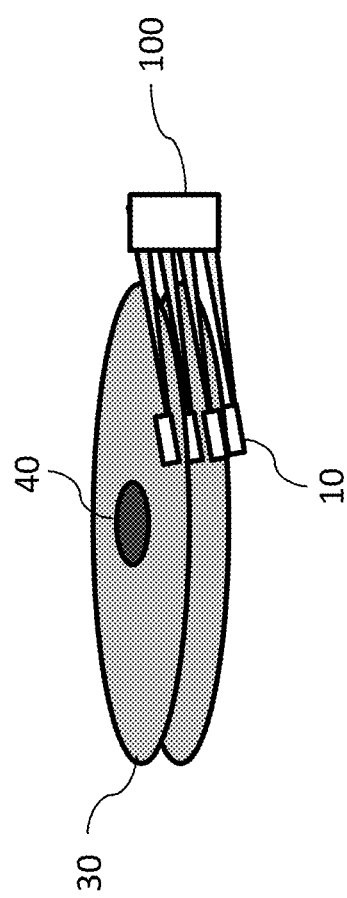
FIG. 2C illustrates a perspective view of a hard disk drive head apparatus adjacent to two disks, in accordance with some embodiments.
Figure 2D:
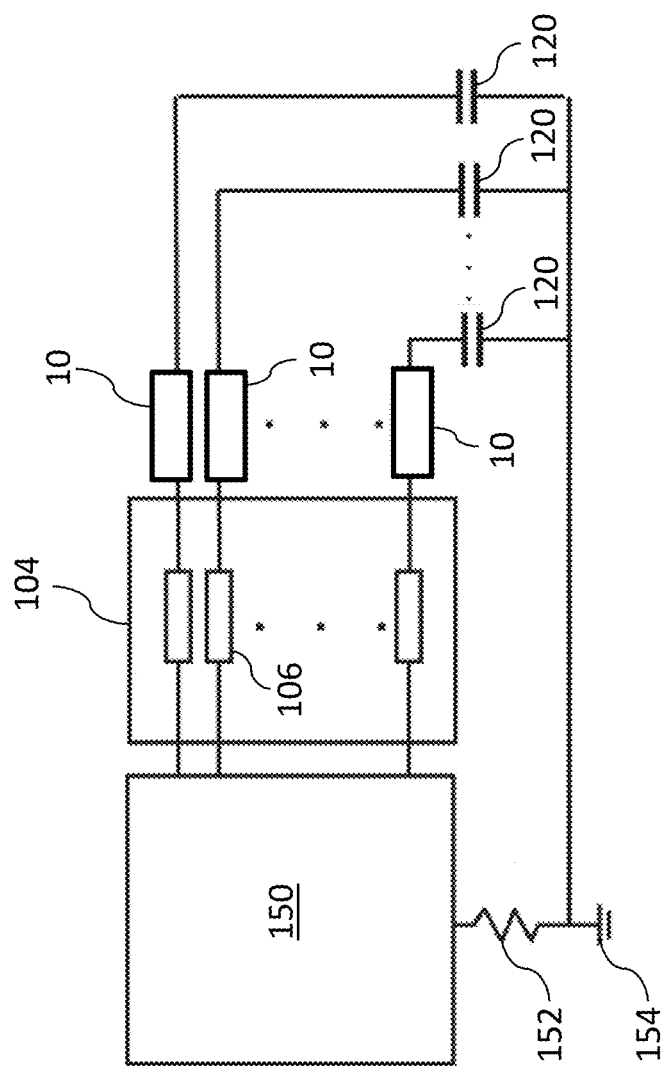
FIG. 2D illustrates a schematic of the hard disk drive head apparatus of FIG. 2A, in accordance with some embodiments.

FIG. 2A illustrates a hard disk drive head apparatus 100 having a plurality of heads 10, FIG. 2B illustrates a head 10 mounted to a suspension assembly 101, FIG. 2C illustrates a perspective view of a portion of the hard disk drive head apparatus 100 adjacent to two disks, and FIG. 2D illustrates a schematic of the hard disk drive head apparatus 100 of FIG. 2A. Disk drives (e.g., hard disk drives) generally include respective pluralities of read/write heads.

FIG. 2C illustrates an example disk drive having two disks 30 adjacent to each other, with one disk 30 stacked on top of the other disk 30. The disks 30 rotate around a spindle 40. The heads of the hard disk drive head apparatus 100 are arranged to face respective sides of the disks 30. Each head 10 may be used to read from or write to one side of a disk 30.

A hard disk drive will usually include two heads 10 for each disk 30. Although FIG. 2C illustrates a hard disk drive with two disks 30 and four heads 10, any suitable number of heads 10 and disks 30 may be used. For example, a hard disk drive with one disk 30 may have two heads 10, a hard disk drive with two disks 30 may have four heads 10, and a hard disk drive with three disks 30 may have six heads 10.

In some commonly used modes of operation, only one selected head 10 out of the plurality of heads 10 is activated while reading or writing to a disk 30. The other heads 10 of the plurality of heads 10 are inactive while the selected head 10 is active. Thus, it is possible to use any other components of the other heads 10 while the selected head 10 is active. Embodiments of the present disclosure use a capacitive sensor of an inactive head 10 in order to reduce the effects of ground bounce and thermal drift on measurements of fly height made with a capacitive sensor of the selected head 10.

As illustrated in FIGS. 2B and 2D, each of the plurality of heads 10 is coupled to one or more preamplifier(s) 150 (also referred to as a preamp). FIG. 2B illustrates a head 10 mounted to a suspension assembly 101. The head 10 is coupled through a trace 102 mounted on the suspension assembly 101 to a flexible connection 104 (also referred to as a flex) that is coupled to the preamplifier 150 (not illustrated in FIG. 2B). FIG. 2D shows a schematic of the preamplifier 150 and its connections to ground and each of the heads 10 of the plurality of heads 10. The preamplifier 150 is coupled to a ground 154 (e.g., the ground of the film 32; see above, FIG. 1) through a resistor 152. In some embodiments, the resistor 152 is not an intended component of the system, but rather includes resistance present in circuit traces and connections (e.g., the trace 102) between the preamplifier 150 and the bulk metal of the hard disk drive head apparatus 100 (see above, FIG. 2A). Each of the heads 10 of the plurality of heads 10 is coupled to the preamplifier 150 through individual connections 106 in the flexible connection 104. The individual connections 106 may have lengths of about 2 cm. Each head 10 is coupled to the ground 154 across a respective capacitor 120, where the capacitor 120 is the respective capacitive sensor used to determine the fly height of each head 10 above each respective surface of the disk 30 (see above, FIG. 1).

The preamplifier 150 may be subject to a source of ground noise referred to as ground bounce due to the variation in voltage across resistor 152 that affects capacitive sensors using the capacitors 120. The preamplifier 150 may have multiple additional circuits that are rapidly switched on and off at various times during operation of the disk drive. At least some of these additional circuits may consume large amounts of current that flows to the ground 154 through the resistor 152. This may lead the electric potential of the traces to the ground 154 inside the preamplifier 150 to be different from the electric potential at the ground 154 that is coupled to the heads 10 across respective capacitors 120. This variation in electric potential from the voltage drop across the resistor 152 may add to the voltages on each capacitor 120. This added voltage from the voltage drop across the resistor 152 is not distinguishable by capacitive sensors from voltages across the capacitors 120. As such, this effect is known as ground bounce and is a source of unwanted noise that may corrupt fly height measurement by a capacitive sensor. Additional ground noise may arise from different disturbances (e.g., from radio frequency (RF) to low frequency perturbations, such as in a range of 1 Hz to 10 GHz) occurring between the preamplifier 150 and the disk 30.

Capacitive sensor circuits may also be affected by thermal drift, as the capacitive sensor circuit performances vary with temperature. For example, power dissipation of the preamplifier 150 may be very different between an idle/read mode of the disk drive and a write mode (e.g., a difference in the order of Watts). This power dissipation may lead to significantly different temperatures during different modes of operation of the disk drive. As the capacitive sensors may perform differently at different temperatures, this temperature variation across different modes of operation may affect the accuracy of the fly height measurement using the capacitive sensor. For example, the temperature variation may alter the performance of the circuits inside the preamplifier 150 that measure the capacitance and erroneously detect a capacitance change that does not actually exist in the capacitors 120. As a result, the measurement circuit can falsely report a fly height change (corresponding to a capacitance change) that did not physically happen due to the detection circuit temperature changing.

Additionally, some embodiments of a capacitive sensing circuit incorporates the capacitive sensor as part of a circuit that modifies an oscillator frequency as capacitance changes. The frequency may be measured by counting the number of oscillator cycles that occur in a time interval. The disk rotational period of the disks 30 may be used as a convenient time interval for counting numbers of oscillations to determine the capacitance of the capacitive sensor (see below, FIG. 3). As such, error on the spin speed may impact the accuracy of the fly height measurement. The capacitive sensors may be affected by spin speed error arising from, for example, rotational shock affecting the spin rate of the disks 30.

In order to achieve a desired accuracy of fly height measurement, the accuracy of the capacitance measurements by the capacitive sensor are advantageously in a range of 0.2% to 1% error. The capacitance of circuit components coupled to the capacitor 120, the head 10, and the preamplifier 150 (e.g., the trace between the head 10 and the preamplifier 150, various output drivers, resistors, or the like) may have a total capacitance in a range of 10 pF to 20 pF. This is comparable to the capacitance of the capacitor 120, which may be in a range of 20 pF to 100 pF. However, the change in capacitance of the capacitor 120 as the fly height of the head 10 changes may be in a range of $1/10^{th}$ to $1/100^{th}$ of the total capacitance of the circuit components (e.g., a range of 1 pF to 2 pF, or a range of 0.1 pF to 0.2 pF). As such, the effects of ground bounce, thermal drift, and spin speed error may affect the much larger total capacitance of the circuit components and produce errors of 1% or greater on the measurement of the fly height.

As such, it is desirable to reduce the effects of all impairments on the accuracy of fly height measurement. This can be achieved by using an unselected head 10 to remove sources of error (e.g., ground bounce, thermal drift, or spin speed error) that may be very similar across all heads 10. Thus, the sources of error may be subtracted out using the unselected head 10 as a reference.

It is appreciated that the hard disk drive head apparatus 100 and parts thereof as illustrated in FIGS. 2A through 2D is a non-limiting example presented to illustrate a typical disk drive apparatus having multiple heads. Disk drive head apparatuses or any other devices benefitting from embodiments of the disclosure may have any suitable configuration and are not limited to the structures shown in FIGS. 2A through 2D.

Figure 3:
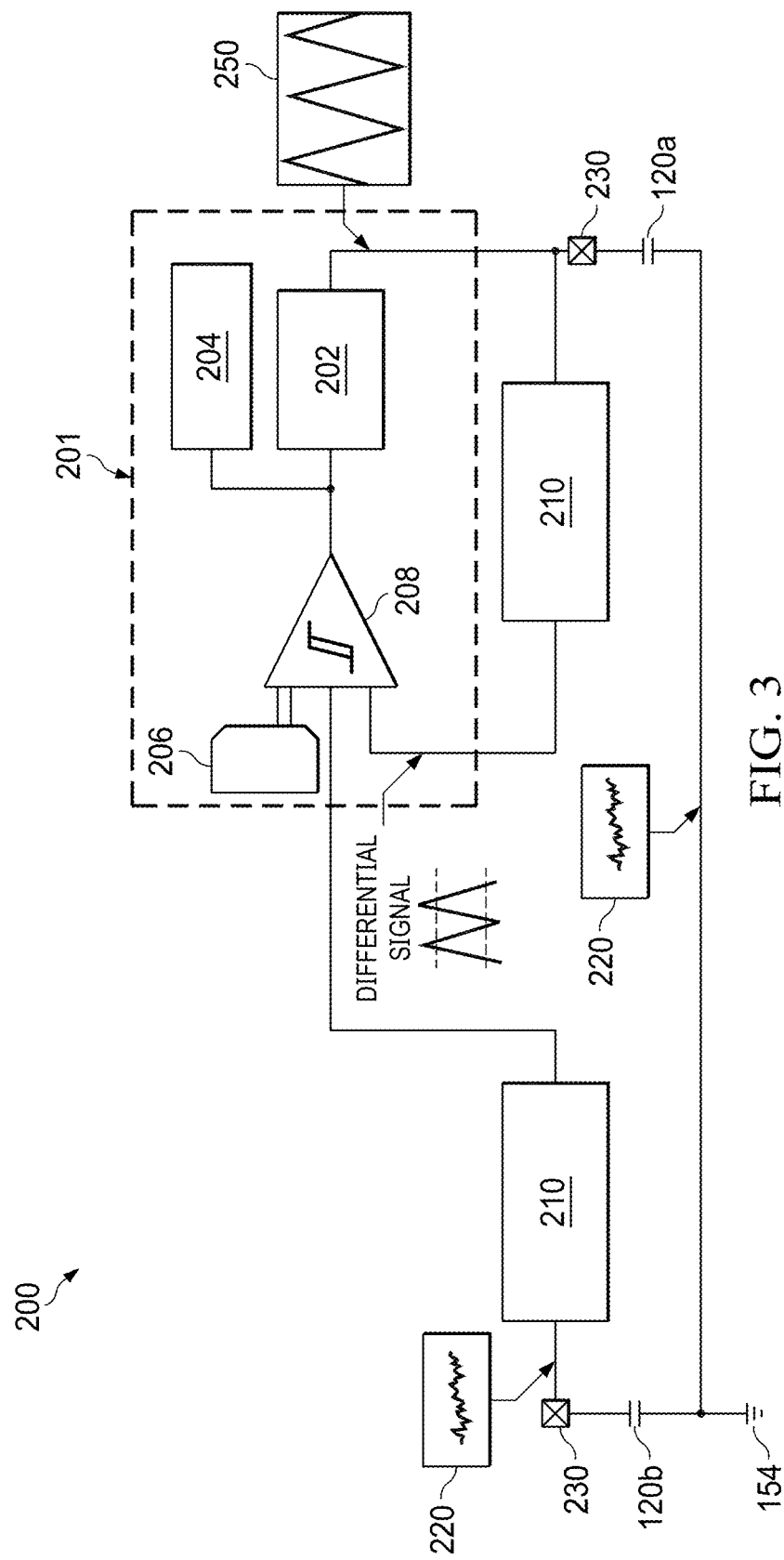
FIG. 3 illustrates a schematic of a system for capacitive fly height measurement, in accordance with some embodiments.

FIG. 3 shows an example schematic of a system 200 for a capacitive fly height sensor with ground sensing, in accordance with some embodiments. A triangular wave current oscillator is implemented that charges and discharges the capacitance of a capacitor formed between a selected head 10 and a disk 30 (see above, FIG. 1). The number of oscillations of the triangular wave oscillator may be counted over a known interval (e.g., a revolution of the disk 30; see above, FIG. 2C) to determine the period of the oscillator. The period is proportional to the capacitance between the selected head 10 and the disk 30. As such, the fly height may be measured by counting the number of oscillations of the triangular wave current oscillator over the known interval.

As illustrated in FIG. 3, a selected head 10 that is active for writing to a disk 30 (is coupled to a ground 154 across a capacitor 120a, where the ground 154 is the disk 30 and the capacitor 120a is formed between the selected head 10 and the disk 30. A capacitive sensor circuit 201 processes a signal from the capacitor 120a to measure the capacitance of the capacitor 120a. In some embodiments, the capacitive sensor circuit 201 includes a current source 202, a counter 204, a threshold digital-to-analog converter (DAC) 206, and a hysteresis comparator 208.

Further referring to FIG. 3, the capacitor 120a is charged by a current source 202. In some embodiments, the current source 202 is coupled to the capacitor 120a across a node 230, such as a pin coupling the selected head 10 to a semiconductor chip containing a counter circuit for the triangular wave current oscillator (e.g., the preamplifier 150). The total impedance of the capacitive sensor circuit 201 as measured from the node 230 to ground may be greater than 1 mega Ohm.

The current source 202 may produce a constant current $I_{chg}$ in a range of 1 µA to 100 mA, generating an increasing voltage across the capacitor 120a and node 230. The voltage may be amplified and buffered by a quality booster circuit 210. When the voltage increases to a value determined by a threshold digital-to-analog converter (DAC) 206, the output of the hysteresis comparator 208 transitions from a low state to a high state causing the current source 202 to reverse direction and remove charge from capacitor 120 which reduces the voltage on node 230. The voltage reduces until the voltage observed at the input of hysteresis comparator 208 is lower than the low threshold of threshold DAC 206, causing the output of the hysteresis comparator 208 to transition to the low state. The low state output causes current source 202 to switch to supplying current into capacitor 120a. This cyclic behavior causes multiple increase and decrease voltage changes on node 230 that approximate a triangle wave. The charging and discharging of the capacitor 120a can be done with a fixed current source, with a current through a resistor (e.g., an RC profile), or with other repeatable profiles. The frequency of the triangular wave 250 is affected by the capacitance of the capacitor 120a, which changes in proportion to the changing of the fly height of the selected head 10.

The hysteresis comparator 208 receives the triangular wave 250 with frequency affected by the capacitance of the capacitor 120a and compares the triangular wave 250 with a threshold voltage $V_{th}$ provided by the threshold digital-to-analog converter (DAC) 206. The hysteresis comparator 208 then outputs a counter-current, which is received by a counter 204 together with the pulsed current from the current source 202. The counter 204 (e.g., a register in the preamplifier 150; see above, FIG. 2D) is configured to count the pulses of the counter-current output by the hysteresis comparator 208 combined with the pulsed current from the current source 202 over a set time interval (e.g., one rotation of the disk 30; see above, FIG. 2C). The resulting pulse rate measured by the counter 204 will have a period proportional to the capacitance $C_{hd}$ of the capacitor 120a, given by the equation $$T \propto \frac{C_{hd} \times V_{th}}{I_{chg}}.$$

As such, counting the number of oscillations of the capacitor 120a charging and discharging per each revolution of the disk 30 allows a measurement of the fly height of the selected head 10 to be made. In some embodiments, a logic device (see below, FIG. 5) is coupled to the capacitive sensor circuit 201 and computes the fly height using the measured capacitance of the capacitor 120a.

In some embodiments, the hysteresis comparator 208 is coupled to the capacitor 120a through a quality booster circuit 210. The quality booster circuit 210 may include elements such as a gain-increasing element (e.g., an operational amplifier), a low-pass filter, a level shifter, or a combination thereof. The quality booster circuit 210 may increase the suitability of the triangular wave 250 at the capacitor 120a as an input for the hysteresis comparator 208.

Noise 220 may be present in the circuit due to ground bounce, thermal drift, or spin speed error. This noise 220 will affect the charging and discharge of the capacitor 120a, and so may alter the measurement of the fly height. The noise 220 may be canceled by including a ground bounce sensing circuit having a capacitor 120b on an unselected head 10 (see above, FIG. 2A) in the system 200. The capacitor 120b is coupled to the same ground 154 as the capacitor 120a (e.g., opposite sides of the same disk 30 or a side of an adjacent disk 30 at a same electric potential as the disk 30). As such, the capacitor 120b will experience the same ground noise (e.g., ground bounce or other perturbations) as the capacitor 120a, and the noise 220 on the capacitor 120b will be the same as the noise 220 on the capacitor 120a. The capacitor 120b is coupled to the hysteresis comparator 208 in order to supply the noise 220 to the hysteresis comparator 208 as a differential signal. In this way, the noise 220 on the capacitor 120a may be canceled from the measurement of the fly height of the selected head 10.

In some embodiments, the capacitor 120b is coupled to the hysteresis comparator 208 across another node 230, such as a pin coupling the unselected head 10 to a semiconductor chip containing a counter circuit for the triangular wave current oscillator (e.g., the preamplifier 150). In some embodiments, the hysteresis comparator 208 is coupled to the capacitor 120b through another quality booster circuit 210.

Although the example of FIG. 3 illustrates a triangular wave current oscillator, the capacitive sensor circuit 201 may also be an oscillator implementing a sinusoidal wave, a square wave, or a sawtooth wave. Any suitable capacitive sensor circuit 201 is within the scope of the disclosed embodiments.

The example of FIG. 3 refers to a capacitor 120a of a selected head 10 that is being used for a disk operation (having its fly height being adjusted) and a capacitor 120b of an unselected head 10 that is latent (having a constant fly height). However, it should be appreciated that the system 200 may also function in a reciprocal fashion when the head 10 coupled to the capacitor 120b is selected for a disk operation and the head 10 coupled to the capacitor 120a is latent. As such, either capacitor of the capacitor 120a and the capacitor 120b may have its capacitance measured when the respective head 10 of the capacitor is selected, and the other capacitor of the capacitor 120a and the capacitor 120b may be used as a reference for ground noise subtraction while the respective head 10 of the other capacitor is latent. Additionally, the system 200 may include couplings to additional capacitors of additional heads 10 of a head apparatus 100 having a plurality of heads 10 (see above, FIG. 2A). Any head 10 of the plurality of heads 10 may be the selected head 10, and any other unselected head 10 may be used as a reference for ground noise subtraction.

Figure 4:
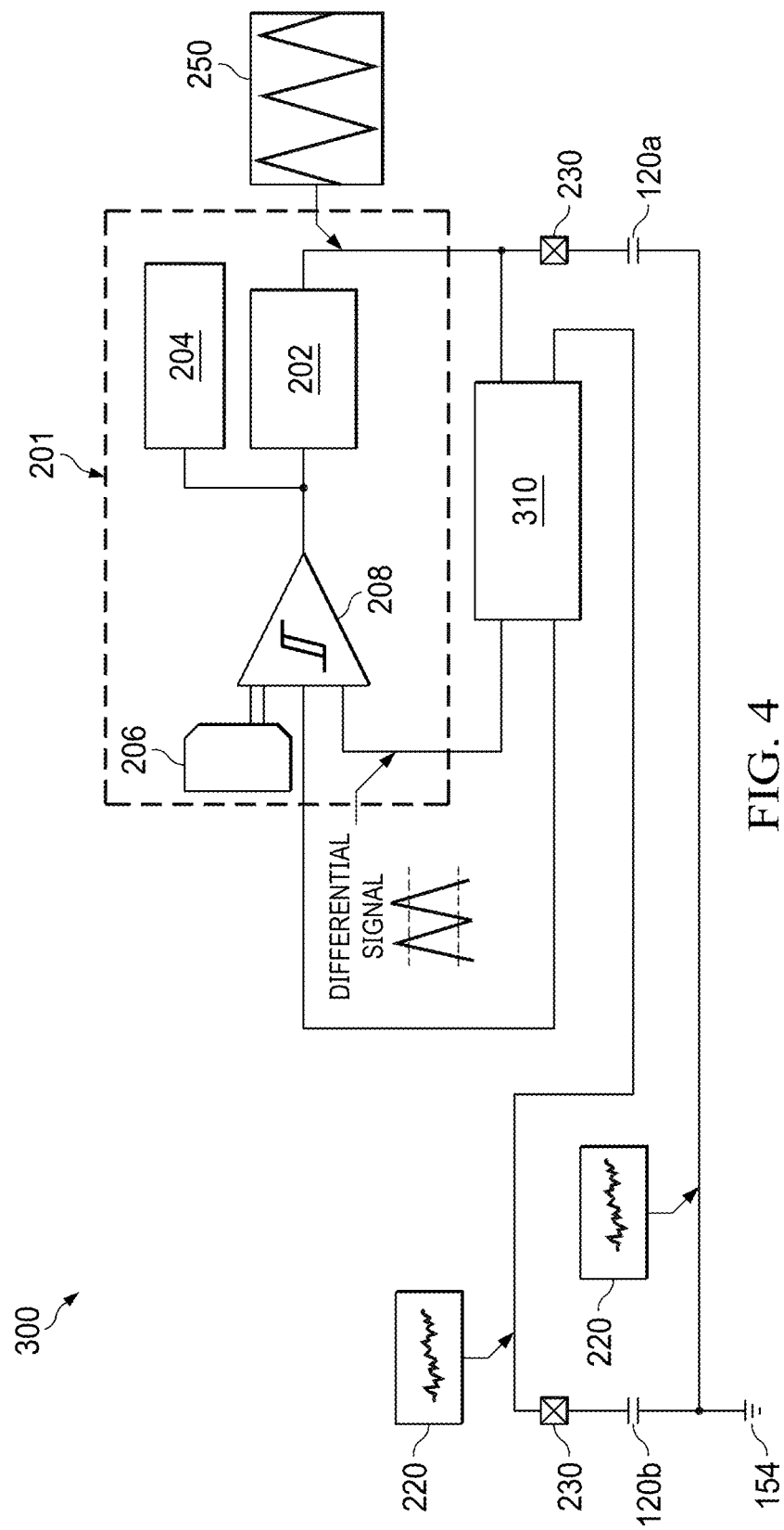
FIG. 4 illustrates a schematic of a system for capacitive fly height measurement, in accordance with some embodiments.

FIG. 4 illustrates an example schematic of another system 300 for a capacitive fly height sensor with ground sensing, in accordance with some embodiments. The system 300 is similar to the system 200 as shown above in FIG. 3, except that the capacitor 120a and the capacitor 120b are both coupled to the hysteresis comparator 208 through a same differential quality booster circuit 310. The differential quality booster circuit 310 may include elements such as a gain-increasing element (e.g., an operational amplifier), a low-pass filter, a level shifter, or a combination thereof. The differential quality booster circuit 310 may also perform subtraction of the noise 220 from the triangular wave 250 prior to the triangular wave 250 being supplied to the hysteresis comparator 208. An example of a differential quality booster circuit 310 is an amplifier that preferentially amplifies the difference between the two capacitor voltages. This may be done by forcing a common mode voltage on the unselected head 10 (coupled to the capacitor 120b) to remove a common mode voltage present on the selected head 10 (coupled to the capacitor 120a).

Figure 5:
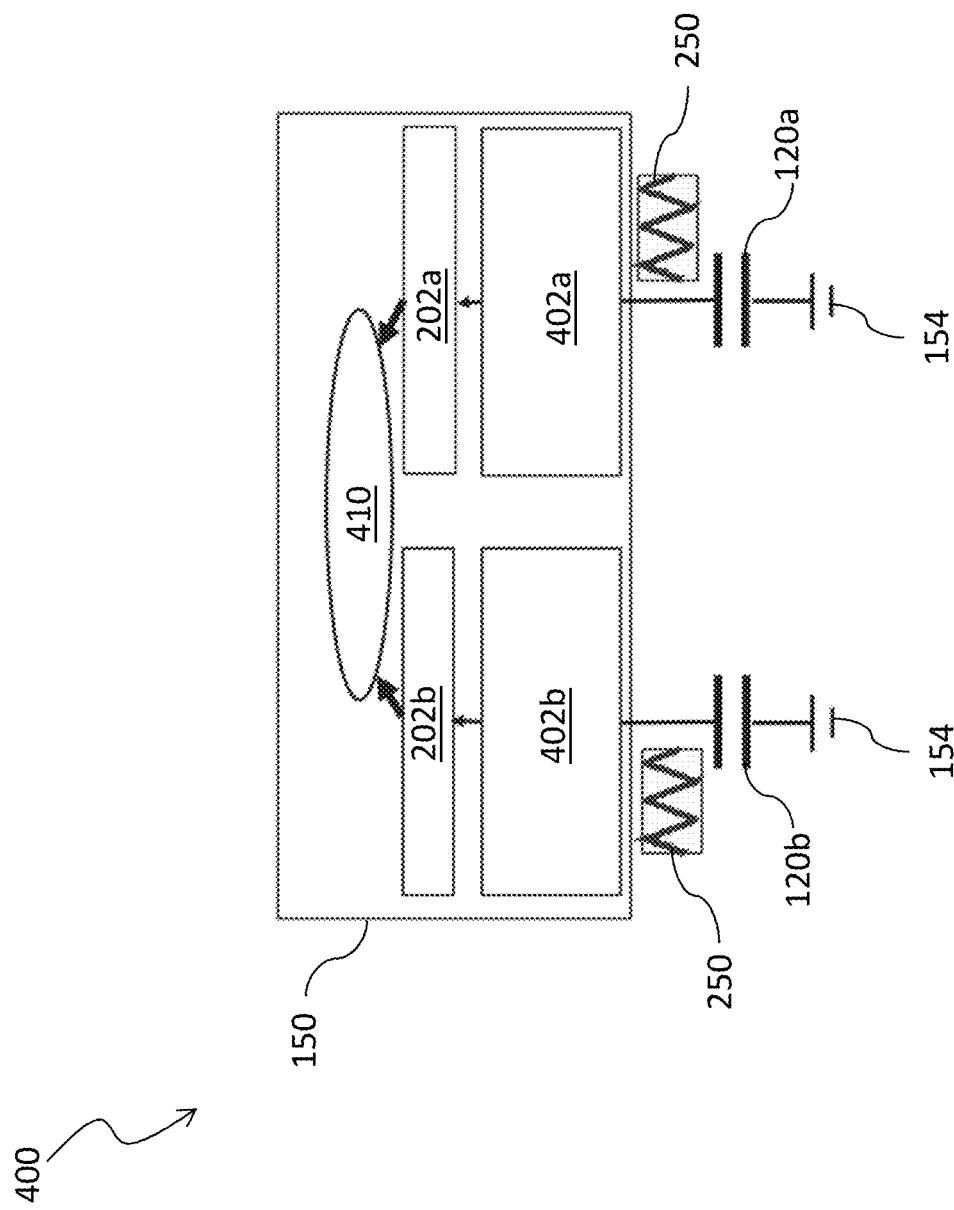
FIG. 5 illustrates a schematic of a system for capacitive fly height measurement, in accordance with some embodiments.

FIG. 5 illustrates a schematic of a system 400 incorporating two capacitive fly height sensors, in accordance with some embodiments. The system 400 includes a capacitive fly height sensor circuit 402a coupled to a capacitor 120a of a selected head 10 (see above, FIG. 2A) and a reference capacitive sensor circuit 402b coupled to a capacitor 120b of an unselected head 10. The capacitive fly height sensor circuit 402a is coupled to a sensor counter 202a and the reference capacitive sensor circuit 402b is coupled to a reference counter 202b. The sensor counter 202a and the reference counter 202b may be similar to the counter 204 as described above with respect to FIG. 3. The sensor counter 202a and the reference counter 202b are coupled to a logic device 410. The capacitive fly height sensor circuit 402a, the reference capacitive sensor circuit 402b, the sensor counter 202a, the reference counter 202b, and the logic device 410 may be part of a preamplifier 150 (see above, FIG. 2D).

The capacitive fly height sensor circuit 402a processes signal from the capacitor 120a to measure the changing capacitance of the capacitor 120a of the selected head 10. For example, in embodiments where the selected head 10 is similar to the head 10 as described above with respect to FIG. 1, the capacitance of the capacitor 120a may change as the fly height of the selected head 10 is adjusted. The fly height may be controlled by distorting the profile of the selected head 10 through heating the selected head 10 with a thermal element 24 (see above, FIG. 1). As an example, the capacitive fly height sensor circuit 402a may be similar to the system 200 described above with respect to FIG. 3, without the inclusion of the capacitor 120b and other components connecting the capacitor 120b to the hysteresis comparator 208. However, any suitable circuit for measuring the capacitance of the capacitor 120a may be used for the capacitive fly height sensor circuit 402a.

As the capacitive fly height sensor circuit 402a may be subject to distortions from, e.g., thermal drift or spin speed error, the system 400 includes a reference capacitive sensor circuit 402b coupled to a capacitor 120b of an unselected head 10. Although the unselected head 10 is not active (e.g., its fly height is constant and its respective thermal element is disabled), the reference capacitive sensor circuit 402b has a similar design as the capacitive fly height sensor circuit 402a and shares the same references (e.g., a same DAC threshold, a same charge/discharge current from a same current source, or the like). Additionally, the reference capacitive sensor circuit 402b experiences the same uncontrolled parameters as the capacitive fly height sensor circuit 402a, such as thermal drift from different amounts of power dissipation in the preamplifier 150, ground bounce, or spin speed error. Since the capacitance of the capacitor 120b is constant while the unselected head 10 is not in use and its fly height is constant, any changes in the oscillation frequency of, for example, a triangular wave 250 in the reference capacitive sensor circuit 402b will be due to the distortive effects of the uncontrolled parameters.

Additionally, the frequency of a waveform (e.g., a triangular wave 250) in the capacitive fly height sensor circuit 402a and measured by the sensor counter 202a will be subject to the same distortive effects (e.g., preamplifier parameter variability or common noise) as the frequency of a waveform (e.g., a triangular wave 250) in the reference capacitive sensor circuit 402b and measured by the reference counter 202b. The logic device 410 may then use the reference counter 202b to cancel the distortive effects experienced by the capacitive fly height sensor circuit 402a from the measurement of the sensor counter 202a, thus improving the measurement of the fly height of the selected head 10. In this way, thermal drift, common mode noise (e.g., ground noise present on the capacitor 120a and the capacitor 120b), and possible time reference variation (e.g., from spin speed error) may be compensated for in the capacitive fly height sensing measurement for the selected head 10. The removal of the distortive effects from the measurement of the sensor counter 202a using the measurement of the reference counter 202b may be implemented with software, firmware, hardware, the like, or a combination thereof in the logic device 410.

The example of FIG. 5 refers to a capacitive fly height sensor circuit 402a coupled to a selected head 10 that has its fly height being adjusted and a reference capacitive sensor circuit 402b coupled to an unselected head 10 that is latent and has a constant fly height. However, it should be appreciated that the system 400 may also function in a reciprocal fashion when the head 10 coupled to the capacitive fly height sensor circuit 402a is selected for a disk operation and the head 10 coupled to the reference capacitive sensor circuit 402b is latent. As such, the capacitive fly height sensor circuit 402a may be used as a reference for noise subtraction while the reference capacitive sensor circuit 402b is used for measuring fly height. Additionally, the system 400 may include couplings to additional capacitors of additional heads 10 of a head apparatus 100 having a plurality of heads 10 (see above, FIG. 2A). Any head 10 of the plurality of heads 10 may be the selected head 10, and any other unselected head 10 may be used as a reference for common mode noise or time reference variation subtraction.

Figure 6:
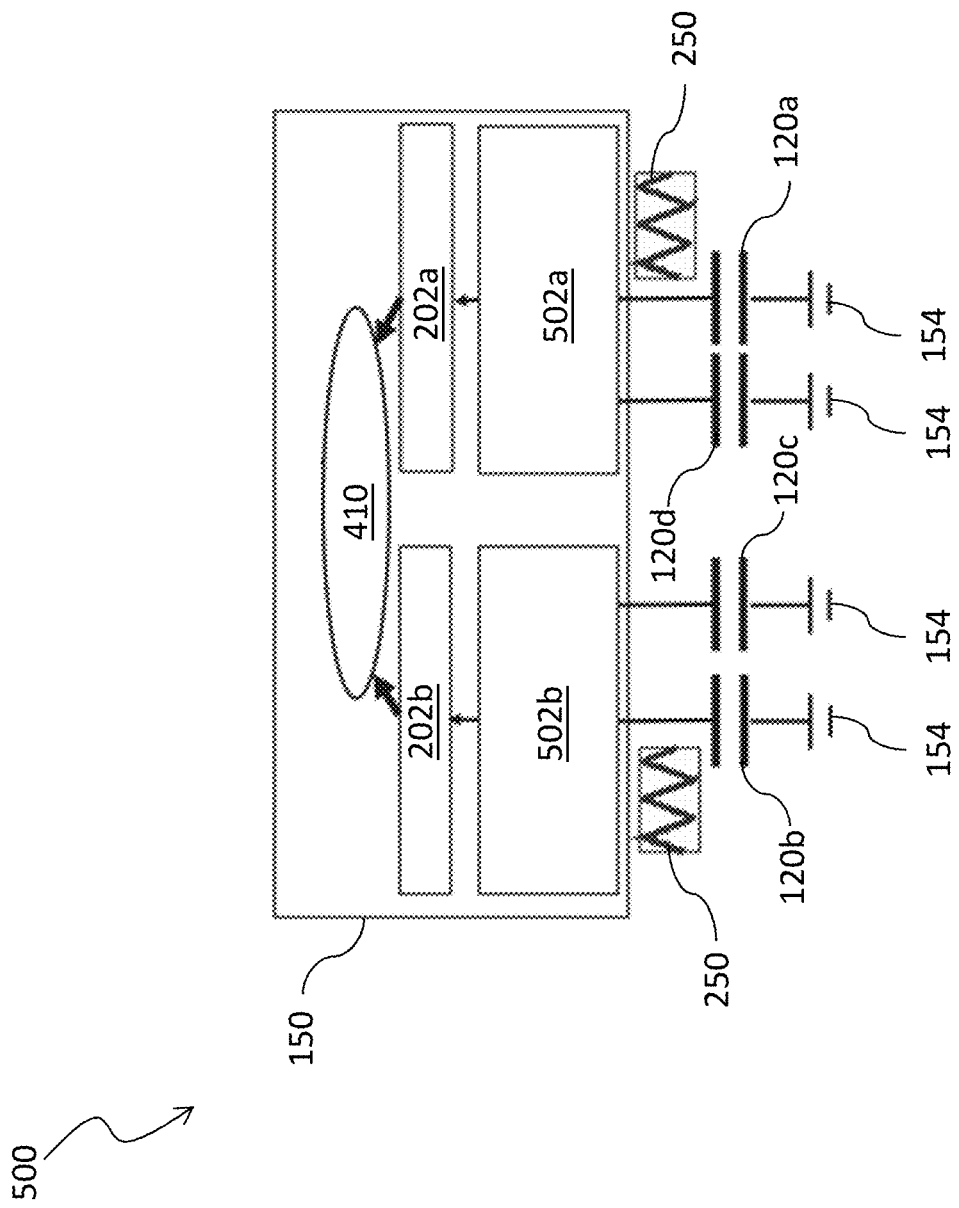
FIG. 6 illustrates a schematic of a system for capacitive fly height measurement, in accordance with some embodiments.

FIG. 6 illustrates a schematic of a system 500 incorporating two capacitive fly height sensors, each with an oscillator circuit and a ground bounce sensing circuit in accordance with some embodiments. The system 500 is similar to the system 400 as described above with respect to FIG. 5, but with two capacitive fly height sensor circuits 502a and 502b each including an oscillator and a ground bounce sensing circuit. The system 500 is thus an embodiment that is a combination of the embodiment of FIG. 5 with the embodiments of FIG. 3 or 4. The capacitive fly height sensor circuit 502a is coupled to a capacitor 120a of a selected head 10 (see above, FIG. 2A) and to a capacitor 12od of an unselected head 10. The capacitive fly height sensor circuit 502b is coupled to a capacitor 120b of another unselected head 10 and to a capacitor 120c of another unselected head 10. As such, the system 500 includes four heads 10 of a head apparatus 100 having a plurality of heads 10 (see above, FIG. 2A). The four heads 10 may have any suitable arrangement relative to disks 30 (see above, FIG. 2C). As an example, a first head 10 is on a first side of a first disk 30, a second head 10 is on a second side of the first disk 30 opposite the first side of the first disk 30, a third head 10 is on a first side of a second disk 30 adjacent to the first disk 30, and a fourth head 10 is on a second side of the second disk 30 opposite the first side of the second disk 30.

The capacitive fly height sensor circuit 502a may be similar to the system 200 described above with respect to FIG. 3 or to the system 300 described above with respect to FIG. 4. The capacitor 12od provides common mode rejection of ground noise on the capacitor 120a by differential comparison. This may be useful for removing the ground noise from the signal (e.g., a triangular wave 250) in the capacitive fly height sensor circuit 502a.

The capacitive fly height sensor circuit 502b may also be similar to the system 200 described above with respect to FIG. 3 or to the system 300 described above with respect to FIG. 4. The capacitor 120c provides common mode rejection of ground noise on the capacitor 120b by differential comparison. The capacitive fly height sensor circuit 502b provides further compensation for effects such as thermal drift, ground bounce, and possible time reference variation (e.g., from spin speed error) that are present across the capacitive fly height sensor circuit 502b and the capacitive fly height sensor circuit 502a. This operation is similar to the function of the reference capacitive sensor circuit 402b as described above with respect to FIG. 5.

The example of FIG. 6 refers to a capacitive fly height sensor circuit 502a coupled to a selected head 10 that has its fly height being adjusted as well as an unselected head 10 that is latent and has a constant fly height. The example of FIG. 6 also refers to a capacitive fly height sensor circuit 502b coupled to two unselected heads 10. However, it should be appreciated that the system 500 may also function with any head 10 of the four coupled heads 10 being the selected head 10. As such, the capacitive fly height sensor circuit 502a may be used as a reference for noise subtraction while the capacitive fly height sensor circuit 502b is used for measuring fly height. Additionally, the system 500 may include couplings to additional capacitors of additional heads 10 of a head apparatus 100 having a plurality of heads 10 (see above, FIG. 2A). Any head 10 of the plurality of heads 10 may be the selected head 10, and any other three or more unselected heads 10 may be used as references for common mode noise or time reference variation subtraction.

Figure 7:
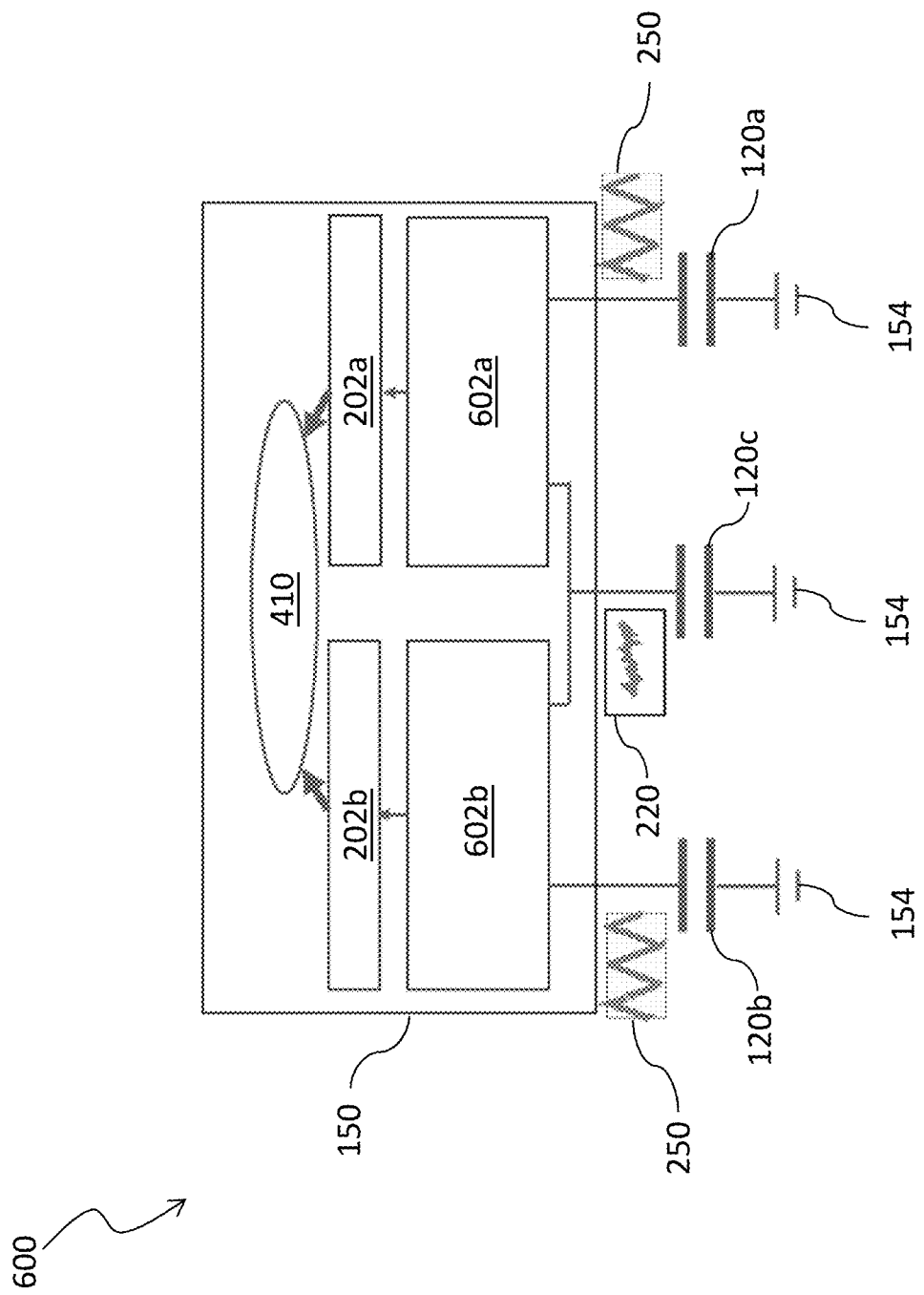
FIG. 7 illustrates a schematic of a system for capacitive fly height measurement, in accordance with some embodiments.

FIG. 7 illustrates a schematic of a system 600 for two capacitive fly height sensors, each having a respective oscillator circuit and sharing a ground bounce sensing circuit, in accordance with some embodiments. The system 600 is similar to the system 500 as described above with respect to FIG. 5, but with a capacitive fly height sensor circuit 602a and a capacitive fly height sensor circuit 602b each including a respective oscillator and sharing a ground bounce sensing circuit including a reference oscillator for noise cancellation. The system 600 is thus an embodiment that is a combination of the embodiment of FIG. 5 with the embodiments of FIG. 3 or 4. The capacitive fly height sensor circuit 602a is coupled to a capacitor 120a of a selected head 10 (see above, FIG. 2A) and to a capacitor 120c of an unselected head 10. The capacitive fly height sensor circuit 602b is coupled to a capacitor 120b of another unselected head 10 and to the same capacitor 120c of the unselected head 10. As such, the system 600 includes three heads 10 of a head apparatus 100 having a plurality of heads 10 (see above, FIG. 2A). The three heads 10 may have any suitable arrangement relative to disks 30 (see above, FIG. 2C).

The capacitive fly height sensor circuit 602a may be similar to the system 200 described above with respect to FIG. 3 or to the system 300 described above with respect to FIG. 4. The capacitor 120c provides common mode rejection of noise 220 on the capacitor 120a by differential comparison. This may be useful for removing the noise 220 from the signal (e.g., a triangular wave 250) in the capacitive fly height sensor circuit 602a.

The capacitive fly height sensor circuit 602b may also be similar to the system 200 described above with respect to FIG. 3 or to the system 300 described above with respect to FIG. 4. The capacitor 120c provides common mode rejection of ground noise on the capacitor 120c by differential comparison for the capacitive fly height sensor circuit 602b as well as the capacitive fly height sensor circuit 602a. The capacitive fly height sensor circuit 602b provides further compensation for effects such as thermal drift, ground bounce, and possible time reference variation (e.g., from spin speed error) that are present across the capacitive fly height sensor circuit 602b and the capacitive fly height sensor circuit 602a. This operation is similar to the function of the reference capacitive sensor circuit 402b as described above with respect to FIG. 5.

The example of FIG. 7 refers to a capacitive fly height sensor circuit 602a coupled to a selected head 10 that has its fly height being adjusted as well as an unselected head 10 that is latent and has a constant fly height. The example of FIG. 7 also refers to a capacitive fly height sensor circuit 602b coupled to the unselected head 10 as well as another unselected head 10. However, it should be appreciated that the system 600 may also function with any head 10 of the three coupled heads 10 being the selected head 10. As such, the capacitive fly height sensor circuit 602a may be used as a reference for noise subtraction while the capacitive fly height sensor circuit 602b is used for measuring fly height. Additionally, the system 600 may include couplings to additional capacitors of additional heads 10 of a head apparatus 100 having a plurality of heads 10 (see above, FIG. 2A). Any head 10 of the plurality of heads 10 may be the selected head 10, and any other two or more unselected heads 10 may be used as references for common mode noise or time reference variation subtraction.

Figure 8:
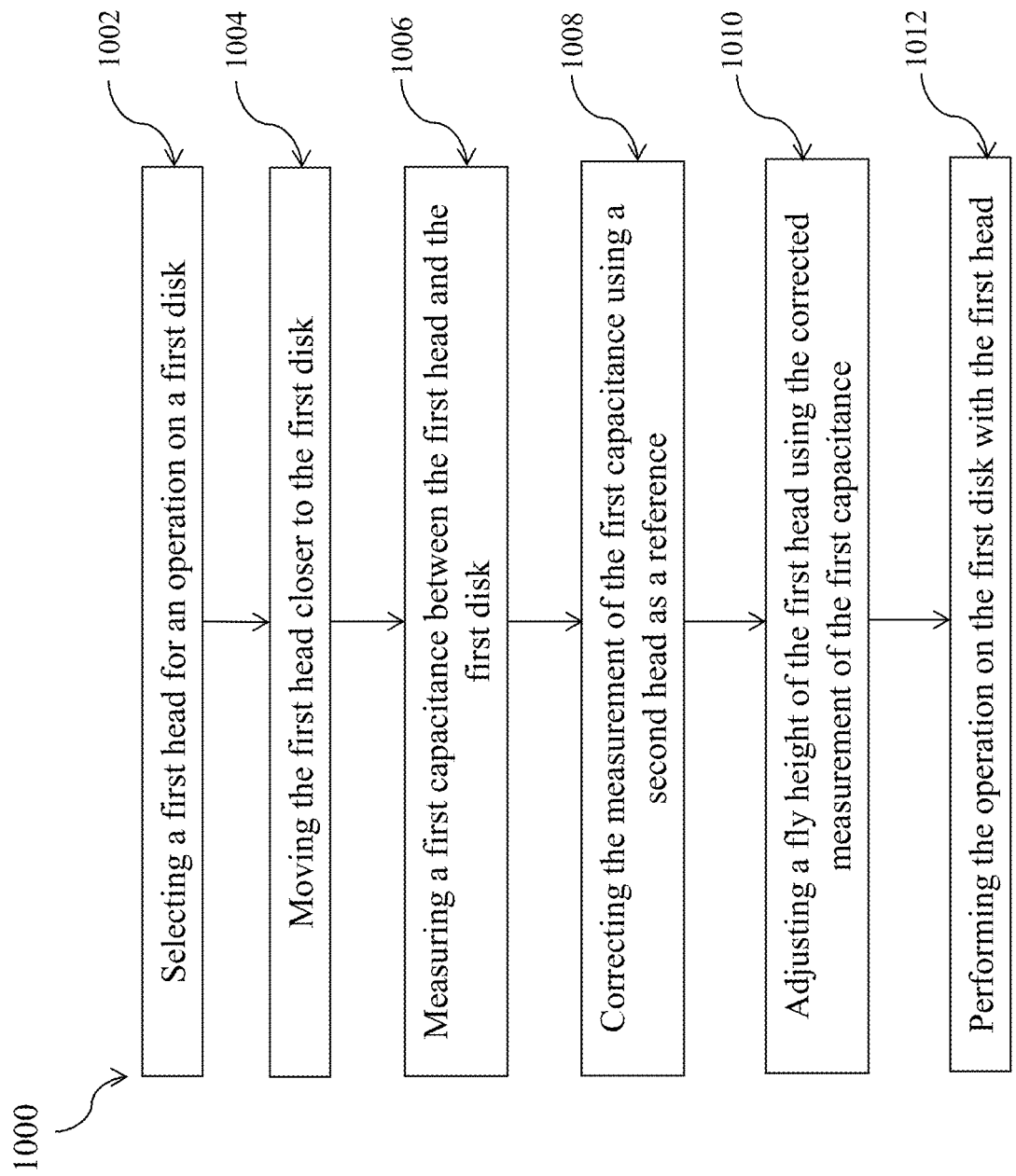
FIG. 8 illustrates a flow chart diagram of an embodiment method for operating a disk drive, in accordance with some embodiments.

FIG. 8 illustrates a flow chart diagram of an embodiment method 1000 for operating a disk drive, in accordance with some embodiments. The disk drive includes a hard disk drive head apparatus 100 having a plurality of heads 10 (see above, FIG. 2A). Each of the plurality of heads is adjacent to a side of a disk 30 (see above, FIG. 2C) of the disk drive.

In step 1002, a first head 10 is selected for an operation on a first disk 30. The operation may be, e.g., a write operation, a read operation, or the like.

In step 1004, the first head 10 is moved closer to the first disk 30 in order to perform the operation with increased accuracy. The first head 10 may be moved closer to the first disk 30 as described above with respect to FIG. 1.

In step 1006, a fly height of the first head 10 is determined by measuring a first capacitance between the first head 10 and the first disk 30. Measuring the fly height and determining the capacitance may be performed as described above with respect to FIG. 3.

In step 1008, the measurement of the first capacitance is corrected using a second head 10 as a reference. The correction (e.g., noise removal) using the second head as a reference may be performed as described above with respect to FIG. 3, 4, 5, 6, or 7.

In step 1010, the fly height of the first head 10 is adjusted using the corrected measurement of the first capacitance. This may be performed by adjusting the power supplied to a thermal element 24 (see above, FIG. 1) using the corrected measurement of the first capacitance as feedback.

In step 1012, the operation is performed on the first disk 30 using the first head 10. The operation may be performed as described above with respect to FIG. 1.

Using a second hard disk drive head to compensate for the ground noise and thermal drift in using capacitance measurements to determine fly height may lead to frequency pulling issues. This may be due to capacitive coupling at the board or flex level. Coupling and cross-talk on the flexible connection 104 (see above, FIGS. 2B and 2D) between two capacitive fly height sensor circuits (with one used to measure capacitance and the other used to sense thermal drift) may result in frequency pulling. If the oscillation frequencies of the oscillators (in other words, the capacitive fly height sensor circuits) are close to each other, frequency tracking may occur between the two oscillators. This can mask information about capacitance measurement and thermal drift sensing.

Respective switches may be added between the capacitive fly height sensor circuits and their respective disk drive heads, such as at nodes 230 (see above, FIGS. 3-4). In other words, the respective switches may be between the disk drive heads and the preamp. The nodes 230 may be at pins coupling the capacitive fly height sensor circuits to their respective disk drive heads. The switches allow for disconnecting the sensor circuits from their respective loads (in other words, from the disk drive heads and their associated capacitance with the disk). When a reference sensor circuit (in other words, a capacitive fly height sensor circuit of an inactive disk drive head) is selected in order to track the thermal drift of the system and compensate for it in another capacitive fly height sensor circuit coupled with the active disk drive head, the respective switch between the reference sensor circuit and the disk drive head is opened. With the switch open, the oscillation frequency of the reference sensor circuit depends on parasitic capacitance in the circuit. The oscillation frequency of the reference sensor circuit continues to track the oscillation frequency drift of the capacitive fly height sensor circuit arising from thermal variation (such as from low-pass filter or comparator delay). As board coupling between the capacitive fly height sensor circuit and the reference sensor circuit is reduced or eliminated by the open switch, the oscillation frequency of the reference sensor circuit may be used to compensate for thermal noise drift in the capacitive fly height sensor circuit.

Figure 9:
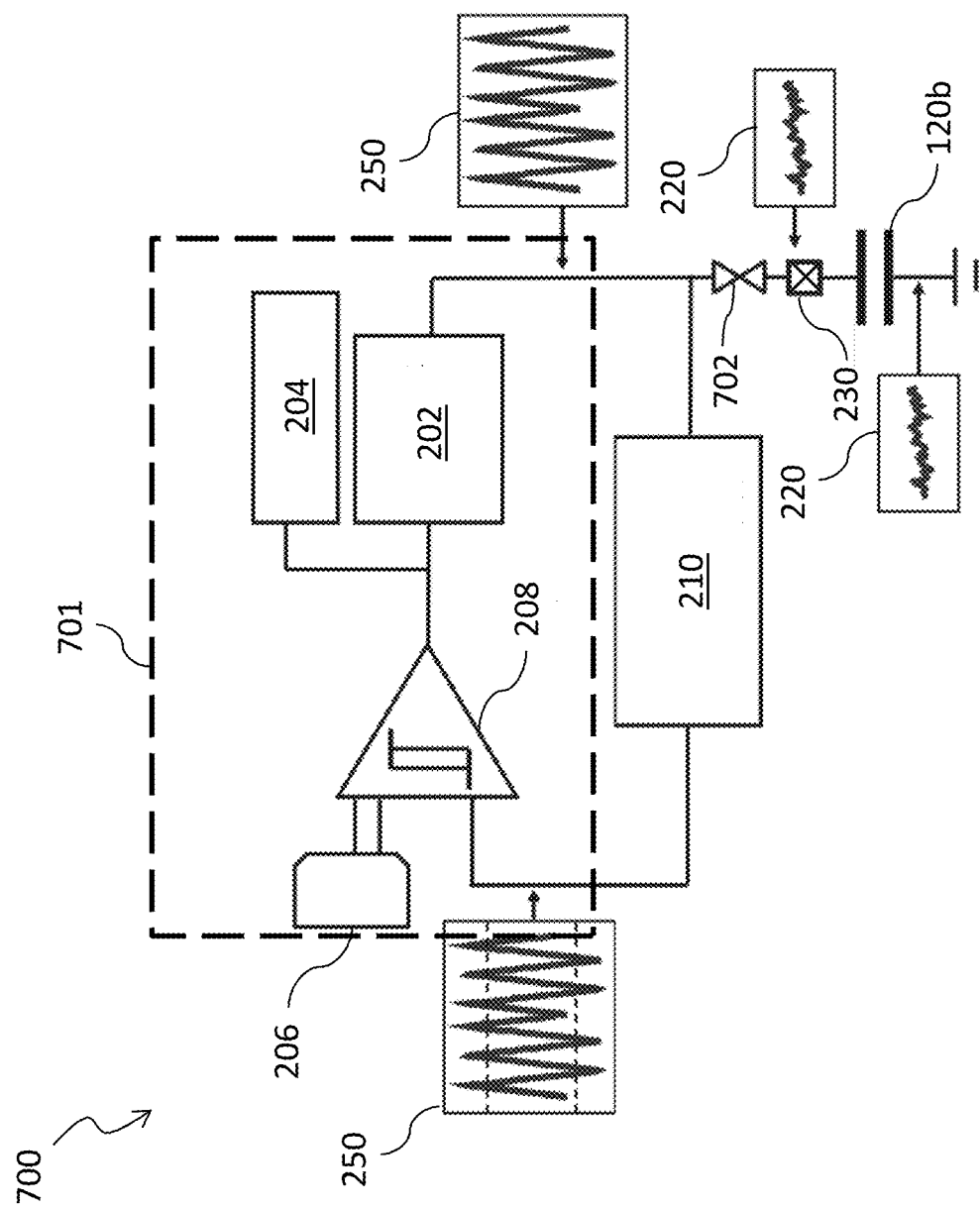
FIG. 9 illustrates a schematic of a system for capacitive fly height measurement, in accordance with some embodiments.
Figure 10:
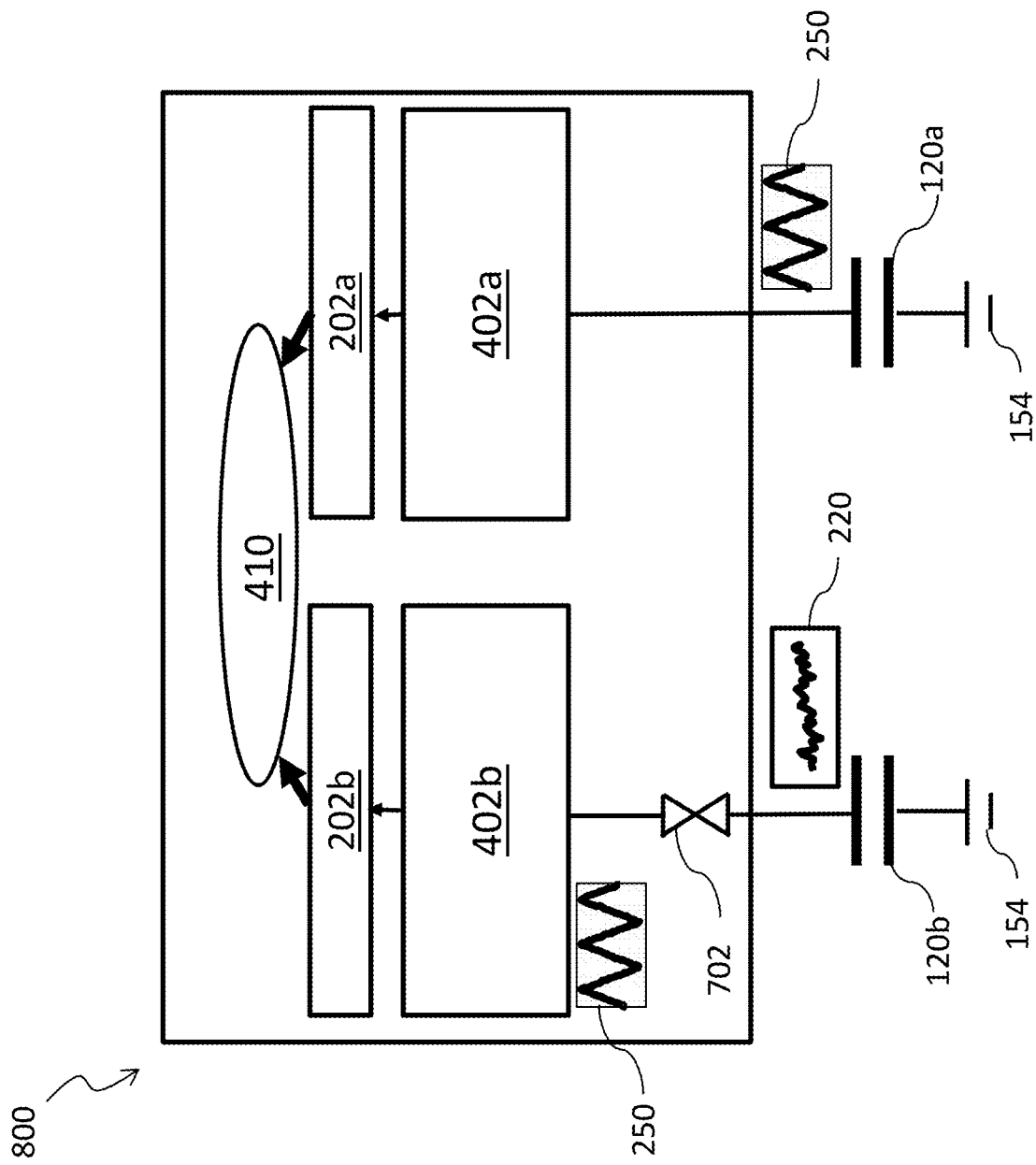
FIG. 10 illustrates a schematic of a system for capacitive fly height measurement, in accordance with some embodiments.
Figure 11:
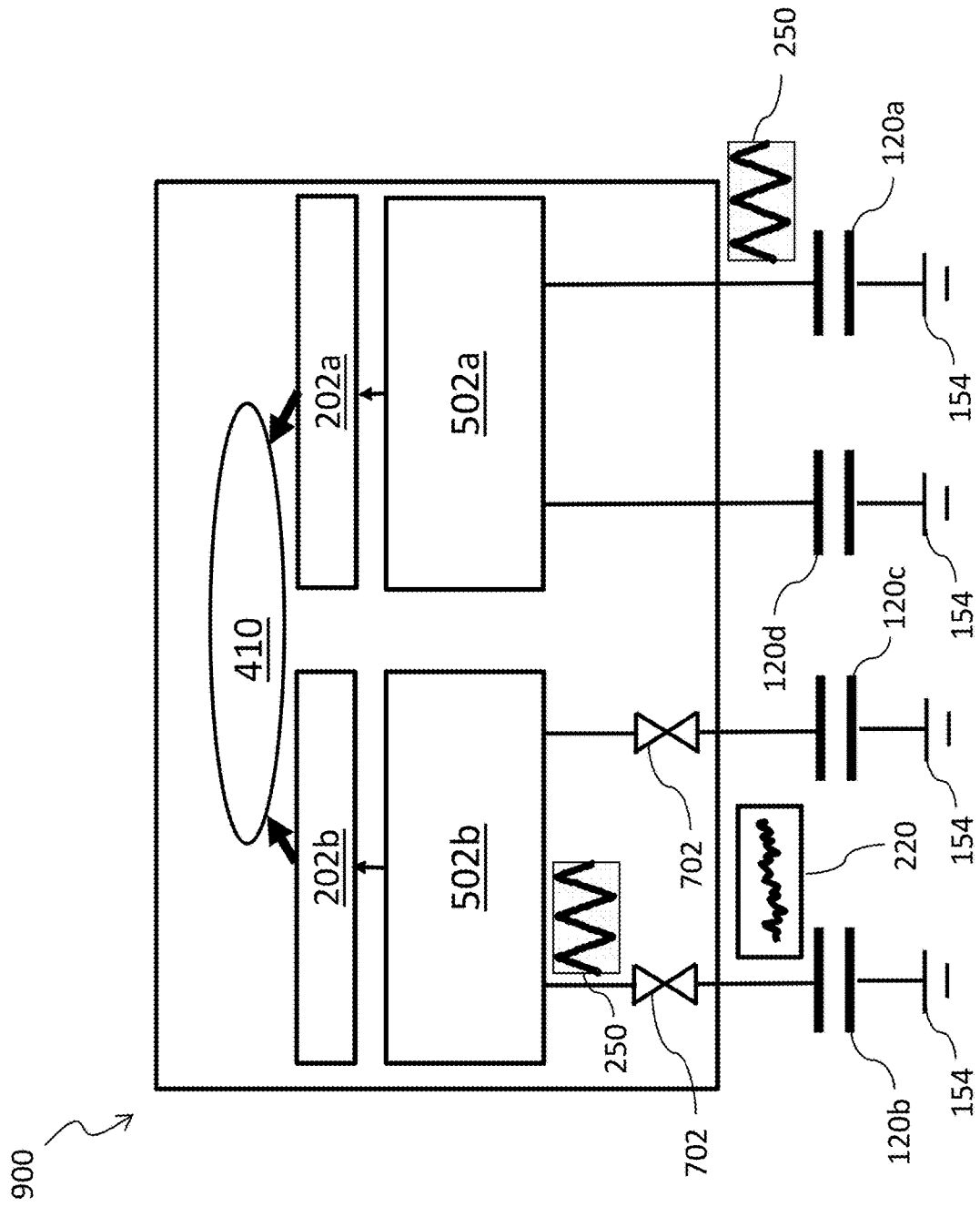
FIG. 11 illustrates a schematic of a system for capacitive fly height measurement, in accordance with some embodiments.

FIGS. 9-11 illustrate schematics of circuits comprising switches between reference sensor circuits and disk drive heads. FIG. 9 illustrates an example schematic of a system 700 for a reference sensor circuit 701 with a switch 702 between the reference sensor circuit 701 and a disk drive head, in accordance with some embodiments. The system 700 is illustrated as a simplified version of the system 300 as described above with respect to FIG. 3, and the details are not repeated herein. Although only one node 230, capacitor 120b, and quality booster circuit 210 are illustrated in FIG. 9, it should be understood that a capacitor 120a, another node 230, and another quality booster circuit 210 may be present as illustrated in FIG. 3. In some embodiments, the reference sensor circuit 701 includes a current source 202, a counter 204, a threshold digital-to-analog converter (DAC) 206, and a hysteresis comparator 208.

A switch 702 (e.g., a pass-gate) is coupled between the node 230 and the conduction path between the current source 202 and the quality booster circuit 210. The switch 702 allows for the capacitor 120b of an unselected head to be disconnected from the reference sensor circuit 701. When the switch 702 is open, the oscillation frequency of the reference sensor circuit 701 depends on parasitic capacitance in the circuit and/or on integrated capacitors that may be coupled for this purpose so that the oscillation frequency is not dependent only on parasitic capacitance (not illustrated in FIG. 9). In some embodiments, one or more external capacitors are coupled by one or more respective switch(es) to the reference sensor circuit 701. This allows for board coupling with a capacitive fly height sensor circuit of a selected head (not illustrated) to be reduced or eliminated. The oscillation frequency of the reference sensor circuit 701 may be used to compensate for thermal noise drift in the capacitive fly height sensor circuit of the selected head. When the switch 702 is closed, the reference sensor circuit 701 may be used as a capacitive fly height sensor circuit for its respective head corresponding to the capacitor 120b.

FIG. 10 illustrates a schematic of a system 800 incorporating two capacitive fly height sensors, in accordance with some embodiments. The system 800 is similar to the system 400 as described above with respect to FIG. 5 with the addition of a switch 702, and the details are not repeated herein. The switch 702 is coupled between the reference capacitive sensor circuit 402b and the capacitor 120b of an unselected head 10. In some embodiments, another switch 702 is present between the capacitive fly height sensor circuit 402a and a capacitor 120a of a selected head 10. The switch 702 may be opened to isolate the reference capacitive sensor circuit 402b from board coupling to the capacitive fly height sensor circuit 402a. This may be useful for using the reference capacitive sensor circuit 402b to compensate for thermal noise drift in the capacitive fly height sensor circuit 402a of the selected head 10, similar to the reference sensor circuit 701 as described above with respect to FIG. 9.

FIG. 11 illustrates a schematic of a system 900 incorporating two capacitive fly height sensors, each with an oscillator circuit and a ground bounce sensing circuit in accordance with some embodiments. The system 900 is similar to the system 500 as described above with respect to FIG. 6 with the addition of two switches 702, and the details are not repeated herein. One switch 702 couples between capacitor 120b and an oscillator circuit of the capacitive fly height sensor circuit 502a, and the other switch 702 couples between capacitor 120c and a ground bounce sensing circuit of the capacitive fly height sensor circuit 502a. The system 500 is thus an embodiment that is a combination of the embodiment of FIG. 6 with the embodiments of FIG. 10. In some embodiments, additional switches 702 are present between the capacitive fly height sensor circuit 502a and the capacitors 120a and 120b. The switches 702 may be opened to isolate the oscillator circuit and the ground bounce sensor circuit from the capacitor 120b and the capacitor 120c, respectively, when the heads coupled to the oscillator circuit and the ground bounce sensor circuit are not in use. This may be useful for using the capacitive fly height sensor circuit 502b to compensate for thermal noise drift in the capacitive fly height sensor circuit 502a, similar to the reference sensor circuit 701 as described above with respect to FIG. 9.

In some embodiments, systems further include built-in self-test (BIST) functionality to evaluate the frequency response profiles of low-pass filters, gain-increasing elements (e.g., an operational amplifier), level shifters, or other elements of quality booster circuits 210 or differential quality booster circuits 310. No external resources may be needed for the BIST functionality.

Low-pass filters may be added to capacitive fly height sensor circuits in order to remove high frequency noise from oscillator loops and improve the accuracy of oscillation frequency measurement. Other quality boosting elements such as gain-increasing elements or level shifters may also be added. However, the latency resulting from these elements (such as from the frequency response of low-pass filters) may have a direct effect on fly height measurement accuracy. Therefore, it is desirable to evaluate the low-pass filters or other quality boosting elements with automatic testing equipment (ATE) to detect device failures.

The oscillation period of a capacitive fly height sensor circuits in a first approximation is $$T \cong \frac{C_{hd} \times V_{th}}{I_{chg}} + 4 \times tg,$$

where tg is the phase delay of the circuits inside the oscillation loop. This phase delay may affect the accuracy of measurements of the capacitance $C_{hd}$ and the resulting fly height measurements. The frequency response profile of a low-pass filter (or of another quality booster circuit element) may be a significant contributor to the phase delay tg. It is advantageous to evaluate the phase delay tg with automatic testing equipment. However, it may be difficult for automatic testing equipment outside of the chip containing the capacitive fly height sensor circuit to evaluate the phase delay with a high degree of accuracy due to, for example, band limitation of buffers used to connect the inside of the circuit with external equipment or parasitic capacitance of the interconnection of the circuit with the measurement block that may impact the band. As such, it is beneficial to implement a BIST in the same device as the capacitive fly height sensor circuit (also referred to as a reference sensor circuit) without using external resources to evaluate the frequency response profile of the low-pass filter (or other quality booster circuit element).

Figure 12:
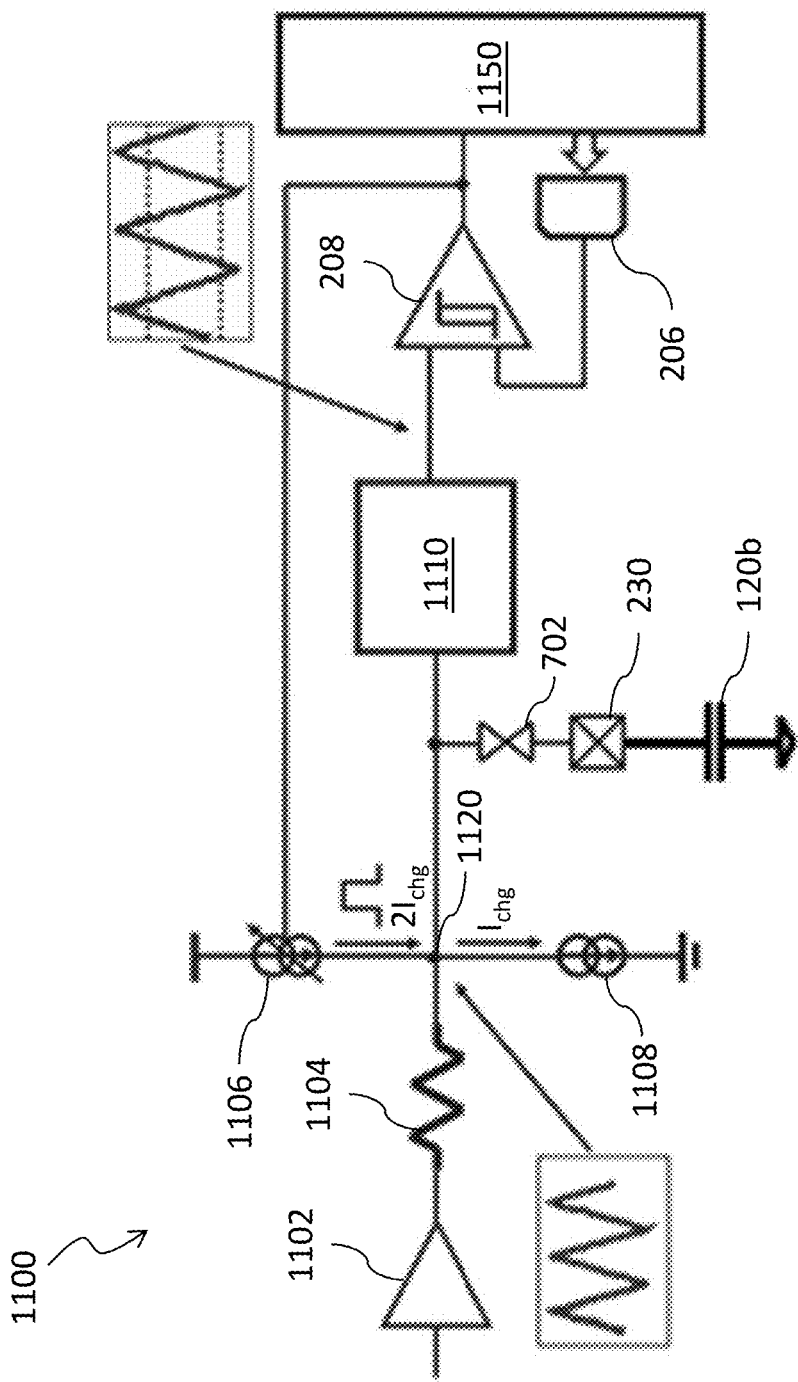
FIGS. 12-14 illustrate schematics of systems for capacitive fly height measurement with built-in self test functionality, in accordance with some embodiments.
Figure 13:
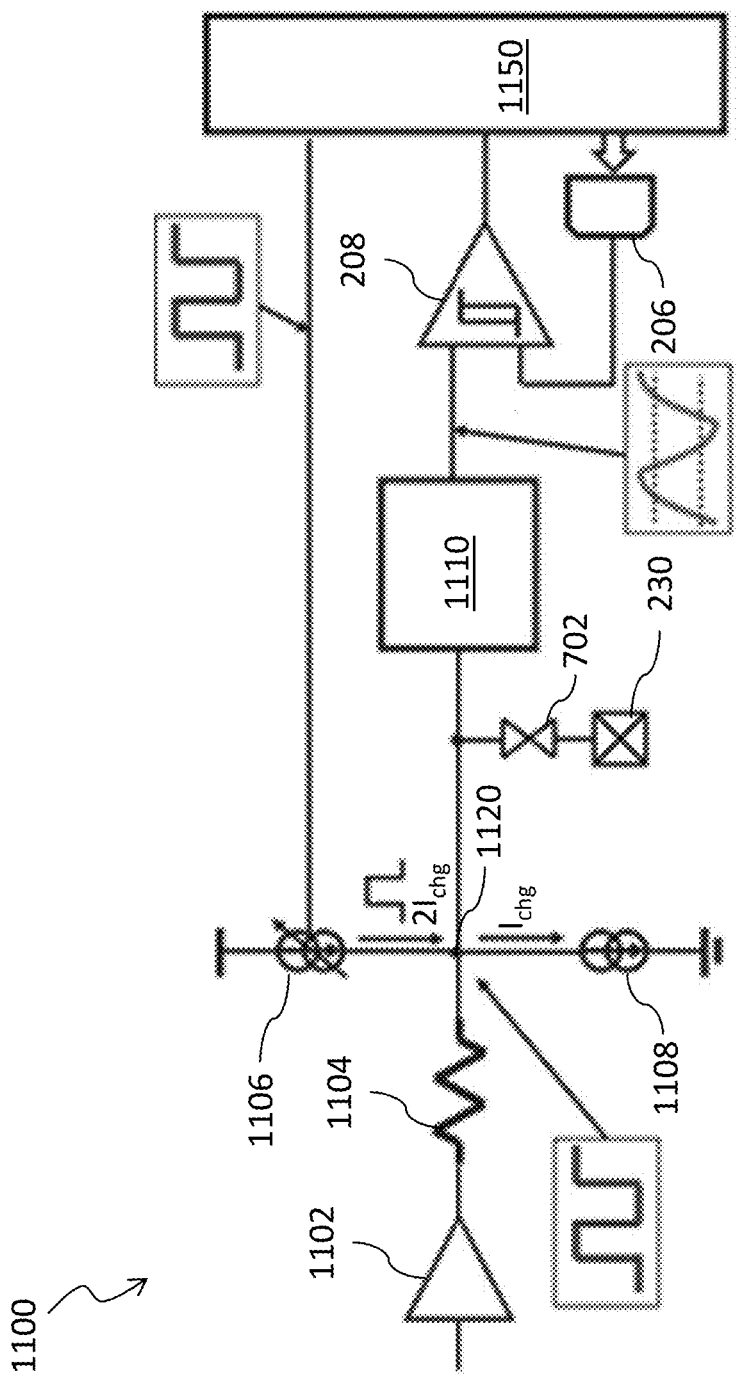

FIGS. 12 and 13 illustrate schematics of a circuit 1100 comprising a BIST to evaluate the frequency response profile of a quality boosting element (e.g., a low-pass filter). FIG. 12 illustrates a schematic of the circuit 1100 in a functional mode (in other words, configured to perform a fly height measurement) and FIG. 13 illustrates a schematic of the circuit 1100 in a BIST mode (in other words, configured to perform a built-in self-test). A quality boosting element 1110 (which may be a low-pass filter, gain-increasing element (e.g., an operational amplifier), level shifter, or a combination thereof) is coupled between a hysteresis comparator 208 and a capacitor 120b (e.g., the capacitance of an unselected disk drive head with a disk) through a switch 702 and a node 230. The hysteresis comparator 208 accepts inputs from the quality boosting element 1110 and a threshold DAC 206. A digital logic circuit 1150 (e.g., a logic device 410 (see above, FIG. 5) or other controller such as a processor, microprocessor, or the like) provides a controlling input to the threshold DAC 206 and receives output from the hysteresis comparator 208. In some embodiments, the digital logic circuit 1150 is coupled to the counter 204 or is configured to perform counting like the counter 204 as described above with respect to FIG. 3. The digital logic circuit 1150 is implemented in a same device as the quality boosting element 1110, the hysteresis comparator 208, and the threshold DAC 206 in order to run built-in self-tests (BISTs).

When the circuit 1100 is in functional mode as illustrated in FIG. 12, the digital logic circuit 1150 provides the output of the hysteresis comparator 208 to a variable current source 1106, which is coupled through a node 1120 to the quality boosting element 1110 and the switch 702. The node 1120 is further coupled to a DC bias amplifier 1102 across a resistor 1104 to provide a DC bias current and to a ground node across a current source 1108. In some embodiments, a current 2 $I_{chg}$ flows from the variable current source 1106 into the node 1120 and a current $I_{chg}$ flows from the node 1120 to the current source 1108. The variable current source 1106, DC bias amplifier 1102, resistor 1104, and current source 1108 are equivalent to the current source 202 as described above with respect to FIG. 3 in the functional mode of the circuit 1100.

FIG. 13 illustrates the circuit 1100 in BIST mode (in other words, running a built-in self-test to evaluate the performance of the quality boosting element 1110). The switch 702 is closed (such as by opening a pass-gate), decoupling the capacitor 120b (see above, FIG. 12) from the rest of the circuit 1100. The digital logic circuit 1150 provides a test signal such as a square wave from a clock in the digital logic circuit 1150 to drive the variable current source 1106 and the resulting charge/discharge current instead of the output of the hysteresis comparator 208 (as in functional mode; see above, FIG. 12).

The test signal passes through the quality boosting element 1110 (e.g., a low-pass filter) and the resulting signal (e.g., a sawtooth wave) is received as input by the hysteresis comparator evaluated by the digital logic circuit 1150. The digital logic circuit 1150 drives the threshold DAC 206 in order to change the threshold of the hysteresis comparator 208 while monitoring the output activity of the hysteresis comparator 208. The digital logic circuit 1150 evaluates the amplitude of the received signal at its input from the hysteresis comparator 208. The digital logic circuit 1150 then repeats the test, such as by changing the frequency of the clock driving the test signal, to evaluate the shape of the frequency response from the quality boosting element 1110. If the frequency response of the quality boosting element 1110 is outside a desired range, the digital logic circuit 1150 provides notification that the quality boosting element 1110 has failed the built-in self-test (BIST). After running a BIST, the quality boosting element 1110 may return the circuit 1100 to functional mode. This BIST does not need external resources and so measurements are advantageously not affected by, for example, band limitation of buffers used to connect the inside of the circuit with external equipment or parasitic capacitance of the interconnection of the circuit with the measurement block.

Figure 14:
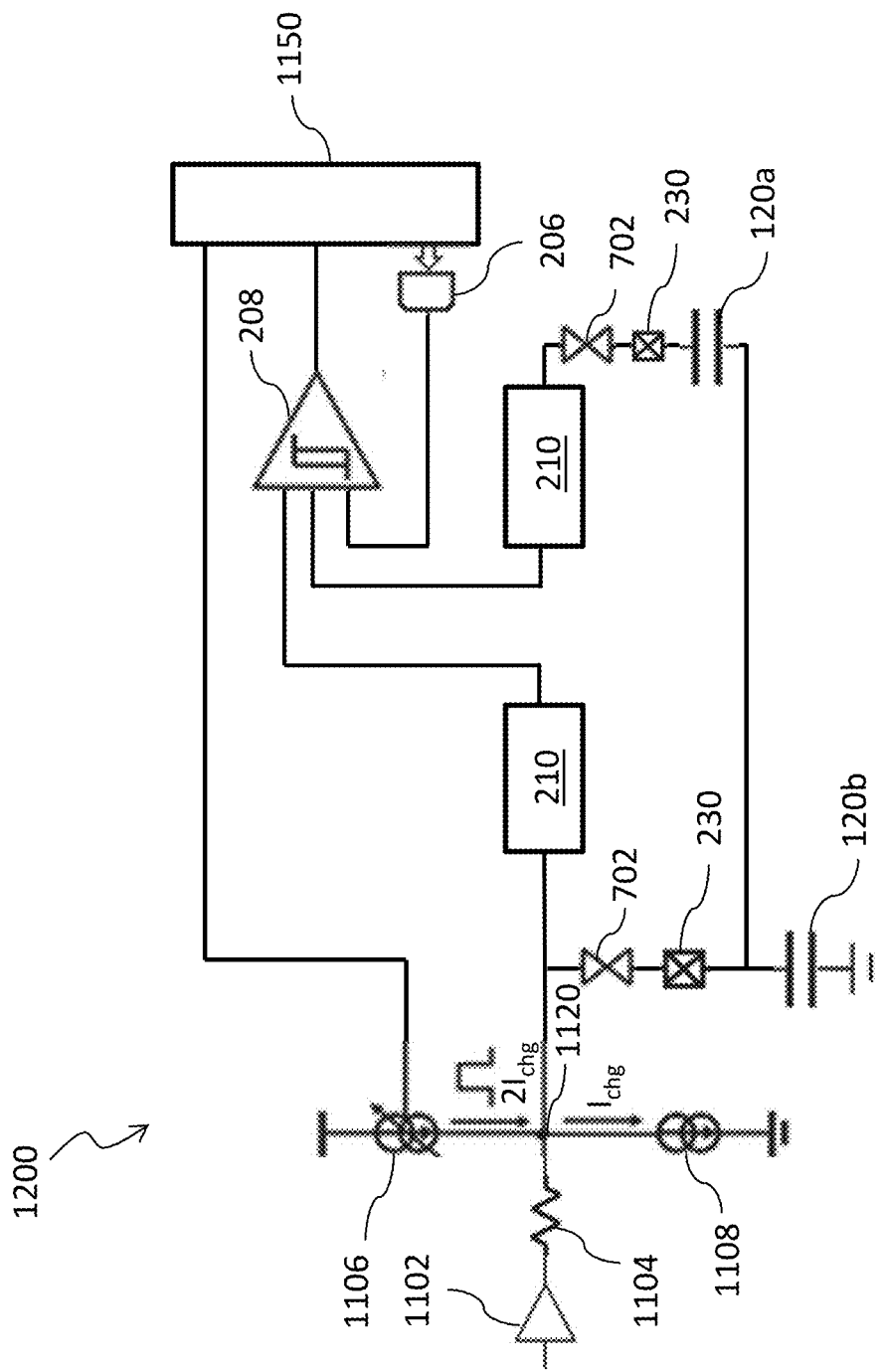

FIG. 14 illustrates a schematic of a system 1200 for a capacitive fly height sensor with ground sensing having one or more switches 702 and built-in self-test functionality, in accordance with some embodiments. The system 1200 is similar to the system 200 as described above with respect to FIG. 3 with the addition of switches 702 and built-in self-test functionality. The system 1200 is thus an embodiment that is a combination of the embodiment of FIG. 3 with the embodiments of FIGS. 9 and FIGS. 12-13, and the details are not repeated herein. Although not illustrated in FIG. 14, the digital logic circuit 1150 may provide output to a current source in order to test the quality booster circuit 210 coupled to the capacitor 120a in addition to the illustrated circuitry to test the quality booster circuit 210 coupled to the capacitor 120b. In some embodiments, the switches 702 and BIST functionality are combined with the embodiment of FIG. 4 (with a differential quality booster circuit 310) or with the embodiments of FIG. 5, 6, or 7. Any and all such suitable combinations are within the scope of the disclosed embodiments.

Figure 15:
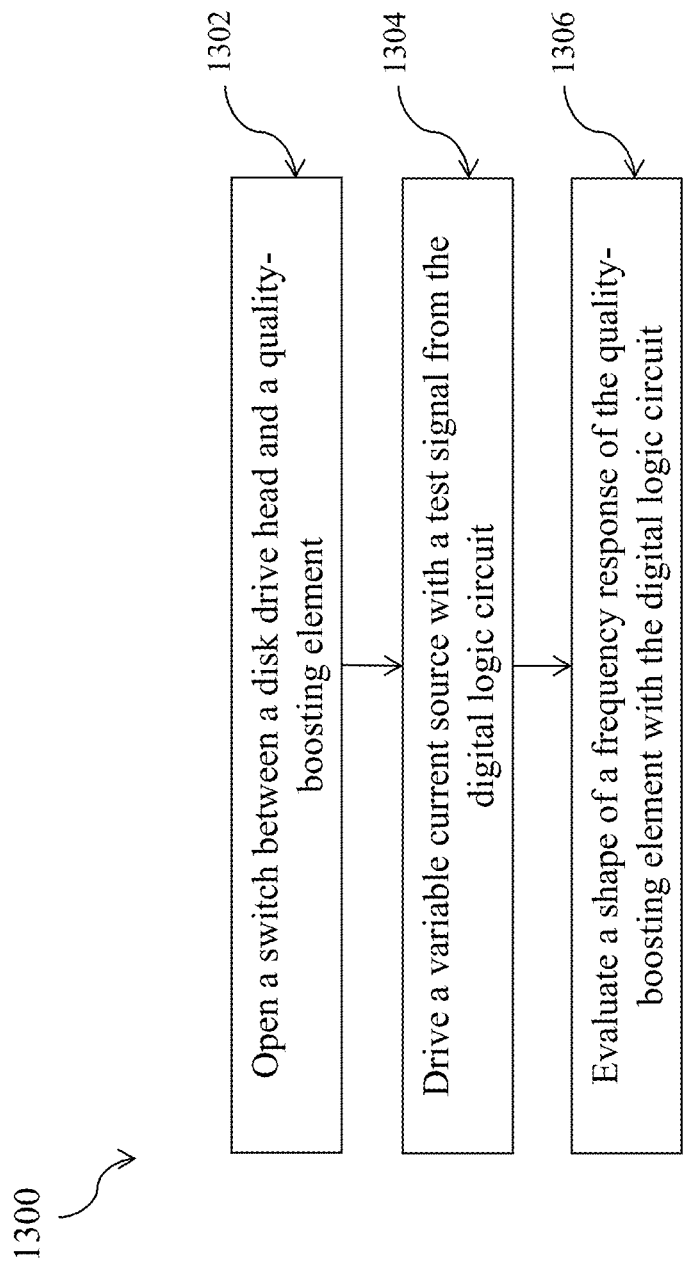
FIG. 15 illustrates a flow chart diagram of an embodiment method for testing a circuit, in accordance with some embodiments.

FIG. 15 illustrates a flow chart diagram of an embodiment method 1300 for testing a circuit, in accordance with some embodiments. In step 1302, a switch 702 between a disk drive head and a quality boosting element 1110 is opened, as described above with respect to FIG. 13. The quality boosting element 1110 is coupled to a first input of a comparator (e.g., a hysteresis comparator 208). An output of the comparator is coupled to a digital logic circuit 1150. The digital logic circuit 1150 is in a same device as the quality boosting element 1110.

In step 1304, the digital logic circuit 1150 drives a variable current source 1106 with a test signal from the digital logic circuit 1150. The variable current source provides the test signal to the quality boosting element 1110.

In step 1306, the digital logic circuit 1150 evaluates a shape of a frequency response of the quality boosting element 1110 while changing a threshold of the comparator. In some embodiments, the quality boosting element 1110 is a low-pass filter.

FIGS. 16 through 20 relate to embodiment systems for capacitive fly height sensors with ground sensing and current mode interconnects that include front end circuits and back end circuits configured to transmit analog signals in current. Transmission of analog signals in current may be advantageous for reducing coupling between traces by reducing amplitude of voltage excursion on traces. Differential analog signals and demultiplexing may be implemented in the front end circuits. Using differential analog signals rather than single-ended analog signals may reduce susceptibility to noise coupling. Demultiplexing being implemented in the front end circuits may reduce coupling between traces and reduce the number of traces and analog signals to be transmitted to the back end circuits. Reducing coupling between traces may be advantageous by reducing frequency pulling between oscillators. Reducing the number of traces may simplify routing the routing layout and save circuit area.

Figure 16:
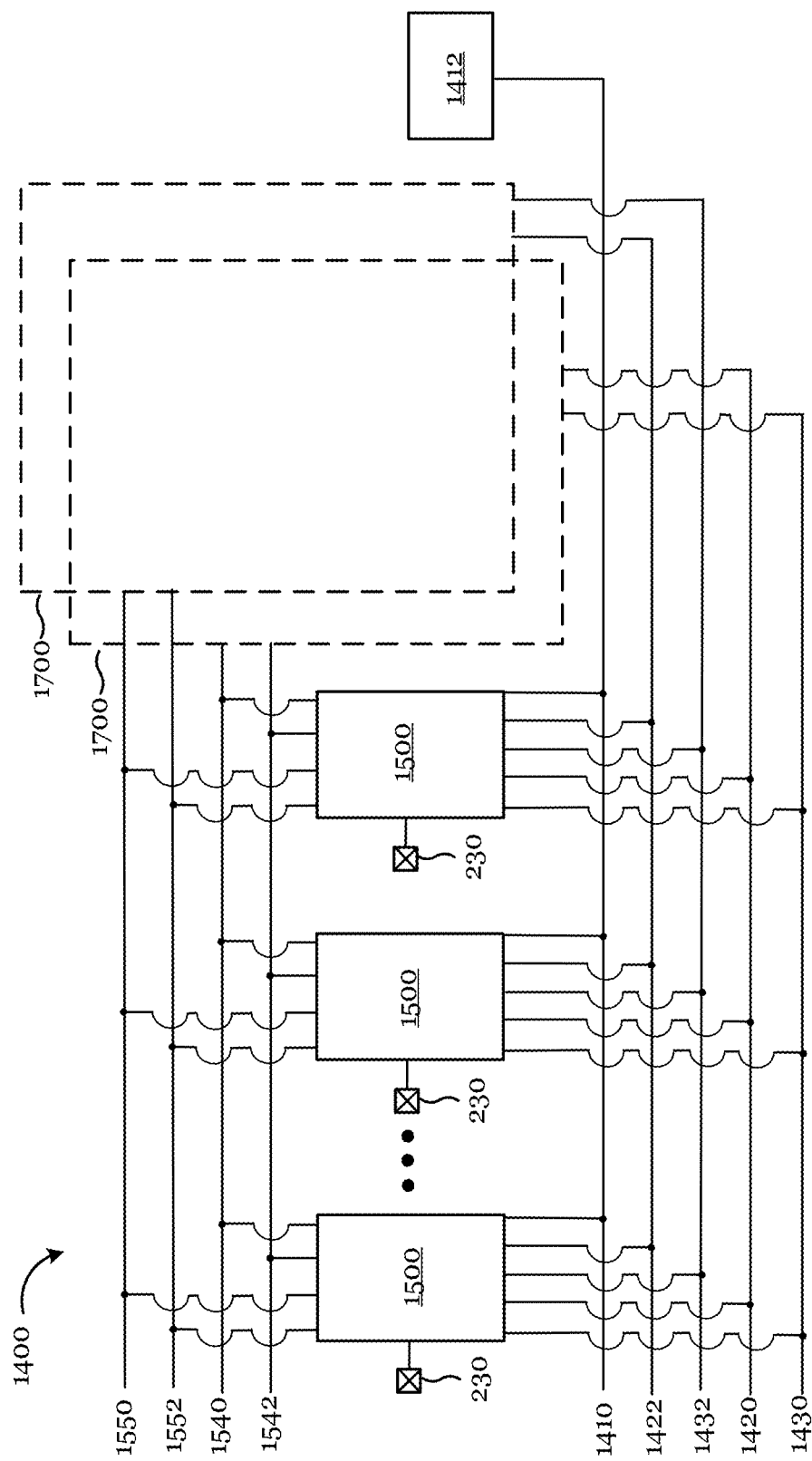
FIG. 16 illustrates a schematic of a system for capacitive fly height measurement with a current mode interconnect, in accordance with some embodiments.

FIG. 16 illustrates a schematic of a system 1400 for incorporating multiple capacitive fly height sensors coupled to disk drive heads with a current mode interconnect, in accordance with some embodiments. In various embodiments, the system 1400 is implemented in circuitry inside a preamplifier (e.g., a preamplifier 150; see above, FIG. 2D). The system 1400 comprises a plurality of front end circuits 1500 and one or more back end circuits 1700. Although FIG. 16 illustrates two back end circuits 1700, the system 1400 may have any suitable number of back end circuits 1700. As an example, in a case where only one capacitive sensor circuit is used with no reference sensor circuit, one back end circuit 1700 may be used. As another example, in a case with, e.g., two capacitive sensor circuits and two reference sensor circuits, four back end circuits 1700 may be used.

Each front end circuit 1500 is coupled to a respective head of a disk drive (e.g., a head 10; see above, FIGS. 1 and 2A-2D) through a respective node 230. The front end circuits 1500 receive analog signals from respective heads and convert them from voltages to currents (such as differential voltages to differential currents) for transmission to the back end circuits 1700. Each back end circuit 1700 converts the analog current signals back to analog voltage signals for use in a respective capacitive sensor circuit 201 (see above, FIGS. 3-4), a respective reference sensor circuit 701 (see above, FIG. 9), the like, or a combination thereof that is part of the back end circuit 1700. Transmission of the analog signals in current from the front end circuits 1500 to the back end circuits 1700 may be advantageous for reducing coupling between traces by reducing amplitude of voltage excursion on traces.

Each front end circuit 1500 receives a common mode voltage from a common mode voltage line 1410, which may be provided by a suitable DC bias source 1412. Each front end circuit 1500 also receives a positive and a negative feedback current from each back end circuit 1700. For example, in the case of the system 1400 comprising two back end circuits 1700, each front end circuit 1500 is coupled to a positive feedback current line 1420 and a negative feedback current line 1430 from a first back end circuit 1700, and each front end circuit 1500 is further coupled to a positive feedback current line 1422 and a negative feedback current line 1432 from a second back end circuit 1700. In various embodiments with more than two back end circuits 1700, each front end circuit 1500 is further coupled to positive and negative feedback current lines from each additional back end circuit 1700.

Each front end circuit 1500 produces an analog current signal as output that is transmitted to each back end circuit 1700. In some embodiments, the analog current signal is transmitted as a clock signal and a reference signal. For example, in the case of the system 1400 comprising two back end circuits 1700, each front end circuit 1500 is coupled to a first clock signal line 1540 and a first reference signal line 1542 that couple with a first back end circuit 1700, and each front end circuit 1500 is further coupled to a second clock signal line 1550 and a second reference signal line 1552 that couple with a second back end circuit 1700. In various embodiments with more than two back end circuits 1700, each front end circuit 1500 is further coupled to clock signal lines and reference signal lines that provide output to each additional back end circuit 1700.

In some embodiments, the system 1400 is combined with the embodiments of FIG. 3, 4, 5, 6, 7, 9, 10, 11, 12, 13, 14, the like, or a combination thereof. For example, each capacitive sensor circuit or reference sensor circuit is part of a respective back end circuit 1700, and each disk drive head is coupled to the back end circuits 1700 through a respective front end circuit 1500. Any and all such suitable combinations are within the scope of the disclosed embodiments.

Figure 17:
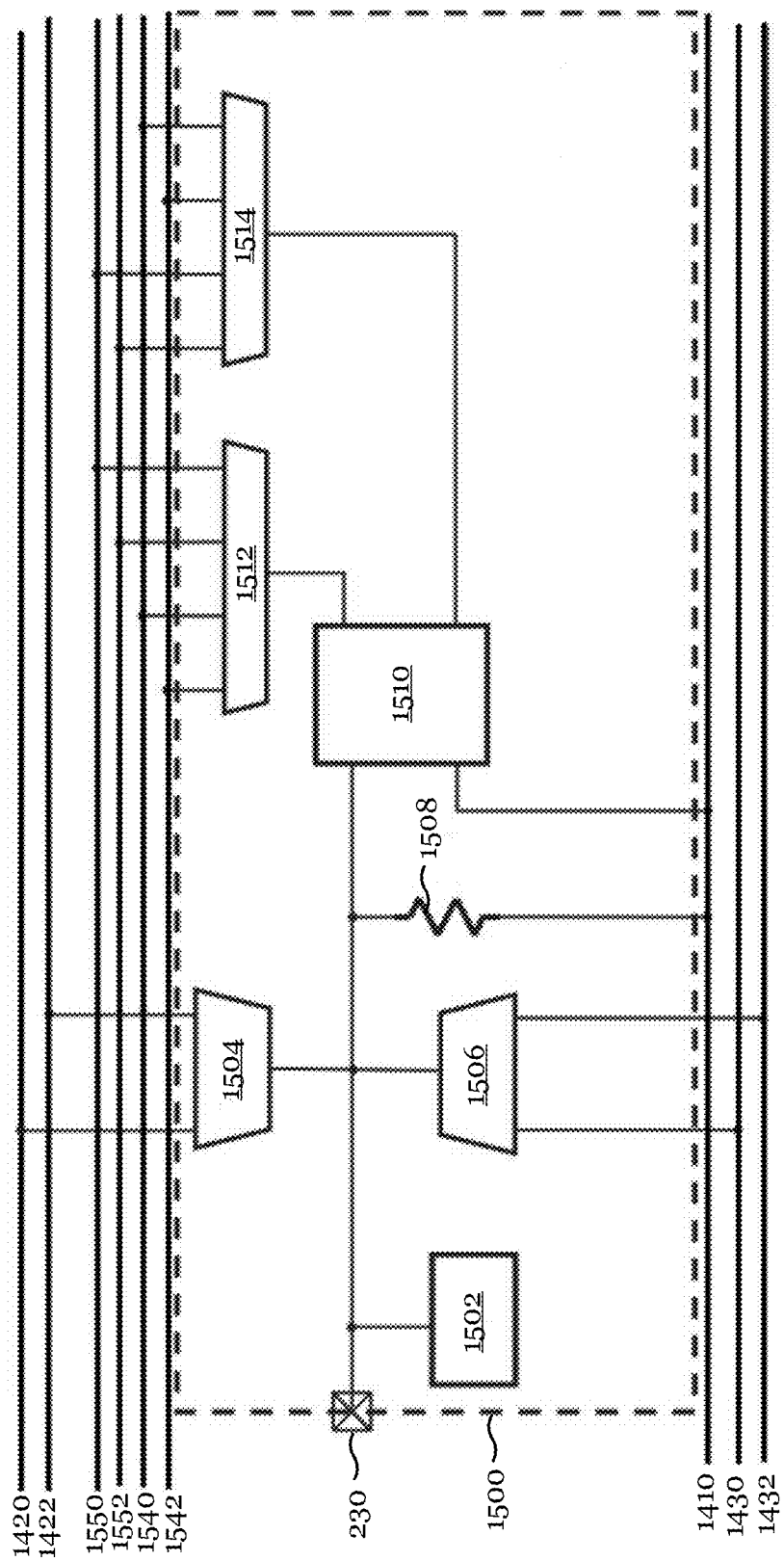
FIG. 17 illustrates a schematic of a front end circuit for capacitive fly height measurement, in accordance with some embodiments.

FIG. 17 illustrates a schematic of an example front end circuit 1500, in accordance with some embodiments. The front end circuit 1500 may be incorporated into the system 1400 as one or more of the front end circuits 1500 illustrated above in FIG. 16. The schematic of the front end circuit 1500 illustrated by FIG. 17 illustrates one non-limiting example device and circuit topology, and embodiments of front end circuits 1500 disclosure may be implemented with any suitable device and circuit topology.

In various embodiments, the front end circuit 1500 comprises conversion circuit 1510, electrostatic discharge (ESD) protection circuit 1502, multiplexer 1504, multiplexer 1506, demultiplexer 1512, demultiplexer 1514, and common mode voltage resistor 1508. Although multiplexers 1504 and 1506 are referred to as multiplexers, the multiplexers 1504 and 1506 perform a demultiplexing of a current from two current sources (the main oscillator and reference oscillator) to the selected head.

The conversion circuit 1510 (which may be a differential voltage to current conversion circuit) receives an analog voltage signal and outputs an analog current signal. A first input terminal of the conversion circuit 1510 is coupled to a disk drive head through a node 230. Although the conversion circuit 1510 is illustrated as a differential circuit, a single-ended voltage to current conversion circuit may also be used. The first input terminal of the conversion circuit 1510 is further coupled to an ESD protection circuit 1502 for protection from electrostatic discharge events, to multiplexer 1504, and to multiplexer 1506. The ESD protection circuit 1502 may be any suitable ESD protection circuit 1502 known to the art.

The multiplexer 1504 is coupled to the positive feedback current line 1420 (delivered by the selected back end circuit 1700) and the positive feedback current line 1422 (delivered by an unselected back end circuit 1700) to provide feedback from one selected back end circuit 1700 to the first input terminal of the conversion circuit 1510. The multiplexer 1506 is coupled to the negative feedback current line 1430 (delivered by the selected back end circuit 1700) and the negative feedback current line 1432 (delivered by an unselected back end circuit 1700) to provide feedback from one selected back end circuit 1700 to the first input terminal of the conversion circuit 1510. In other embodiments that include more than two back end circuits 1700, more inputs are added to the multiplexers 1504 and 1506; the positive feedback currents of additional back end circuits 1700 are coupled to multiplexer 1504 and the negative feedback currents of additional back end circuits 1700 are coupled to multiplexer 1506. The feedback current from the back end circuits 1700 is further coupled to the disk drive head through the node 230 in order to charge and discharge the capacitance between the disk drive head and the disk, as described above with respect to FIG. 3.

A second input terminal of the conversion circuit 1510 may be coupled to the common mode voltage line 1410 to provide a reference voltage for differential voltage comparison with the analog voltage signal from the node 230. In some embodiments, the first input terminal of the conversion circuit 1510 is further coupled to the common mode voltage line 1410 across the common mode voltage resistor 1508. Using differential analog voltage signals rather than single-ended analog voltage signals for conversion to differential analog current signals may reduce susceptibility to noise coupling and increase robustness of the system.

The conversion circuit 1510 provides analog current signal to each of the back end circuits 1700 through respective multiplexers. Implementing demultiplexing in the front end circuits 1500 is advantageous by reducing coupling between traces (thereby reducing frequency pulling between oscillators) and reducing the number of traces and analog signals to be transmitted to the back end circuits 1700 (thereby simplifying routing the routing layout and saving circuit area).

A first output terminal of the conversion circuit 1510 is coupled to the demultiplexer 1512 and a second output terminal of the conversion circuit 1510 is coupled to the demultiplexer 1514. The demultiplexer 1512 and the demultiplexer 1514 are each coupled to the first clock signal line 1540 and the first reference signal line 1542 to provide analog current signal to a first back end circuit 1700. The demultiplexer 1512 and the demultiplexer 1514 are each further coupled to the second clock signal line 1550 and the second reference signal line 1552 to provide analog current signal to a second back end circuit 1700. In other embodiments that include more than two back end circuits 1700, the demultiplexer 1512 and the demultiplexer 1514 are each further coupled to additional clock and reference signal lines to provide analog current signal to each additional back end circuit 1700.

In various embodiments, the conversion circuit 1510, multiplexer 1504, multiplexer 1506, demultiplexer 1512, and demultiplexer 1514 are configured to select one of the back end circuits 1700 with which to exchange input and output analog current signals. For example, the conversion circuit 1510, multiplexer 1504, multiplexer 1506, demultiplexer 1512, and demultiplexer 1514 may be coupled (such as through bases of respective transistors of these features) to a logic device 410 (see above, FIG. 5) or other controller such as a processor or microprocessor. The logic device 410 provides a controlling input in order to activate the appropriate couplings between the front end circuit 1500 and a desired back end circuit 1700.

In various embodiments, different operations of the currents coupled to demultiplexers 1512 and 1514 are implemented. For example, the clock signal current of one front end circuit 1500 may be added to the clock signal current of another front end circuit 1500, or the clock signal current of one front end circuit 1500 may be added to the reference signal current of another front end circuit 1500.

Figure 18:
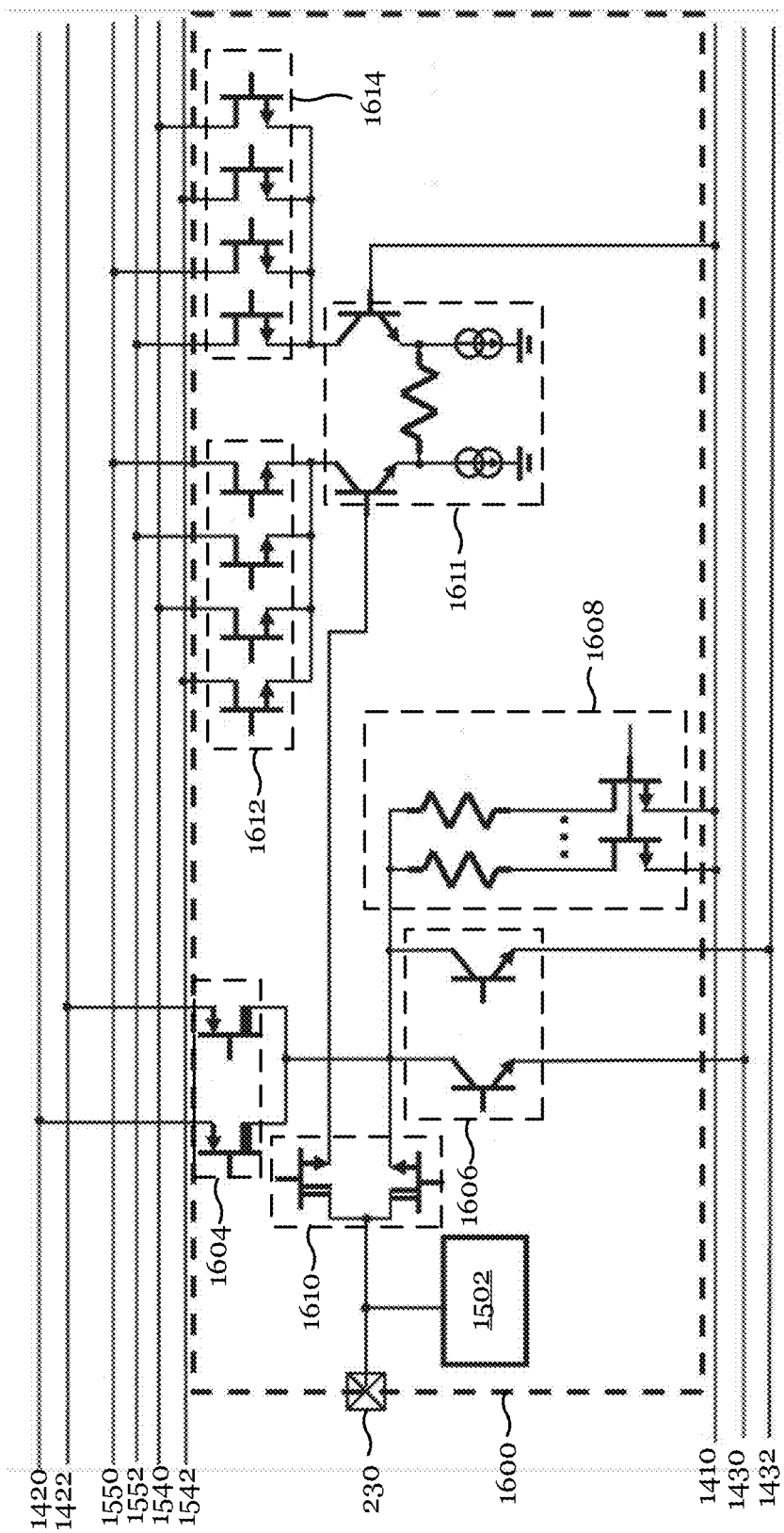
FIG. 18 illustrates another schematic of a front end circuit for capacitive fly height measurement, in accordance with some embodiments.

FIG. 18 illustrates a tentative schematic of an example front end circuit 1600, in accordance with some embodiments. As shown, the schematic of front end circuit 1600 provides a more detailed diagram of a way to implement the front end circuit 1500 (see above, FIG. 17). The schematic of the front end circuit 1600 of FIG. 18 shows details of a selection circuit 1610, conversion circuit 1611, multiplexer 1604, multiplexer 1606, variable resistor 1608, demultiplexer 1612, and demultiplexer 1614 that replace the less detailed conversion circuit 1510, multiplexer 1504, multiplexer 1506, common mode voltage resistor 1508, demultiplexer 1512, and demultiplexer 1514, respectively, of FIG. 17. The couplings of the above listed features to each other and to features external to the front end circuit 1600 are the same as the couplings of the corresponding features of the front end circuit 1500 to each other and to features external to the front end circuit 1500 as illustrated above in FIG. 17, and the details are not repeated herein.

In the example illustrated by FIG. 18, the selection circuit 1610 comprises a pair of coupled transistors (also referred to as a first transistor and a second transistor of the selection circuit 1610), one of which is coupled to the multiplexer 1604, multiplexer 1606, and variable resistor 1608, and the other of which is coupled to the base of a first transistor of the conversion circuit 1611. A first terminal of the first transistor of the conversion circuit 1611 is coupled to a first variable current source and to a resistor of the conversion circuit 1611. A base of a second transistor of the conversion circuit 1611 is coupled to the common mode voltage line 1410. A first terminal of the second transistor of the conversion circuit 1611 is coupled to a second variable current source and to the first terminal of the first transistor of the conversion circuit 1611 through a resistor of the selection circuit 1610. A second terminal of the first transistor of the conversion circuit 1611 opposite its first terminal is coupled to the demultiplexer 1612. A second terminal of the second transistor of the conversion circuit 1611 opposite its first terminal is coupled to the demultiplexer 1514.

In various embodiments, the variable resistor 1608 comprises a plurality of resistors coupled to the common mode voltage line 1410 across respective transistors. The transistors may be opened or closed (such as by input from, e.g., a logic device 410 (see above, FIG. 5)) to adjust the total resistance of the variable resistor 1608 and to change the charge/discharge profile. The variable resistor 1608 may include any suitable number of resistors and transistors.

In various embodiments, the multiplexer 1604 and multiplexer 1606 each comprise a pair of coupled transistors, also referred to as a cascode. In various embodiments, the demultiplexer 1612 and demultiplexer 1614 each comprise four transistors. Additionally, although some transistors are illustrated in FIG. 18 as bipolar junction transistors and other transistors are illustrated as MOS devices, any suitable type of transistor may be used for any illustrated transistors of FIG. 18. Furthermore, in embodiments where polarity is reversed, NPN transistors and NMOS devices may be used for PNP transistors and PMOS devices, respectively, and vice versa.

Figure 19:
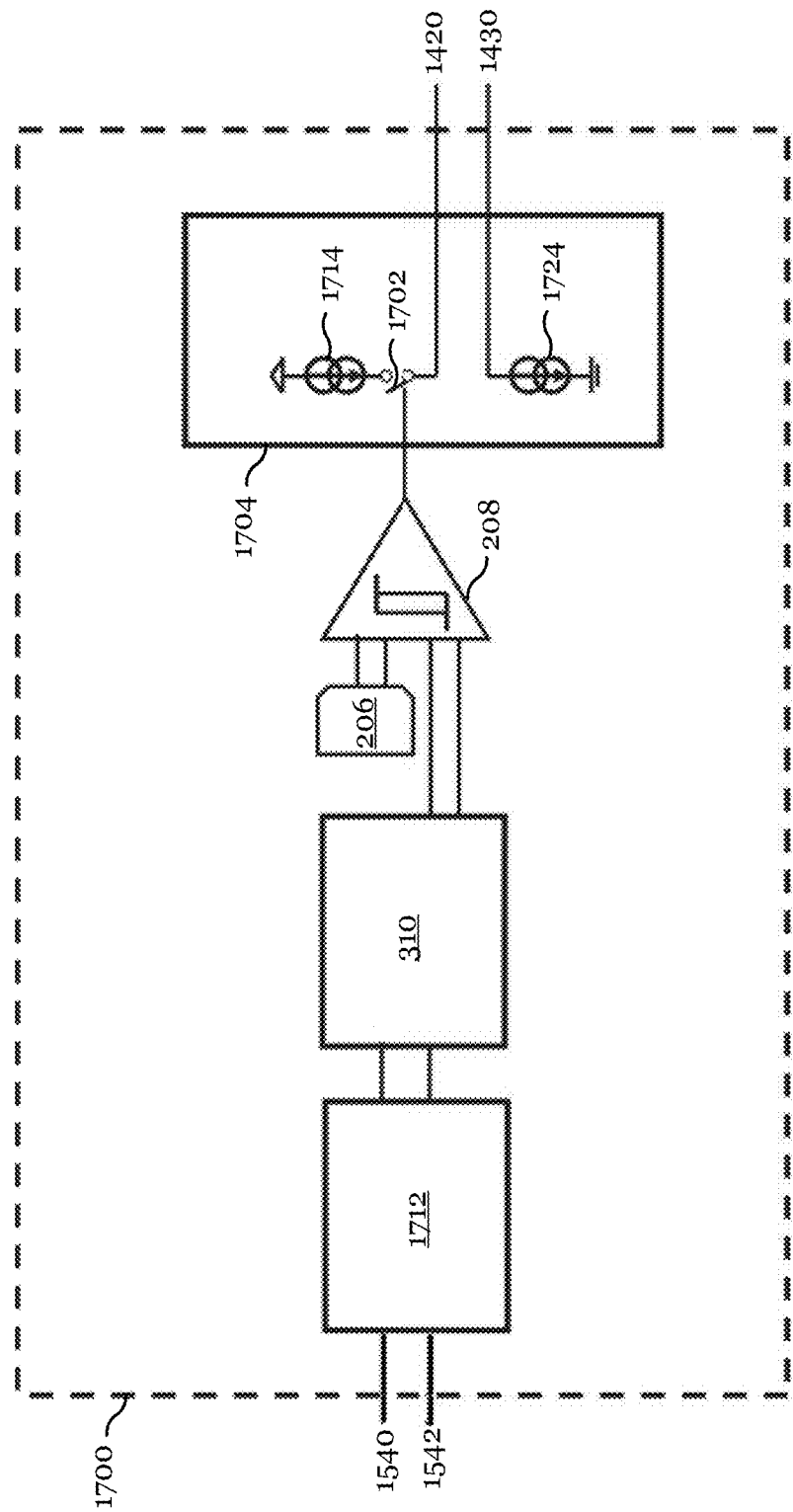
FIG. 19 illustrates a schematic of a back end circuit for capacitive fly height measurement, in accordance with some embodiments.

FIG. 19 illustrates a schematic of an example back end circuit 1700, in accordance with some embodiments. The back end circuit 1700 may be incorporated into the system 1400 as one or more of the back end circuits 1570 illustrated above in FIG. 16. The schematic of the back end circuit 1700 illustrated by FIG. 19 illustrates one non-limiting example device and circuit topology, and embodiments of back end circuits may be implemented with any suitable device and circuit topology. The back end circuit 1700 comprises a conversion circuit 1712 (which may be a differential current to voltage conversion circuit), a quality booster circuit (which may be a differential quality booster circuit 310), a threshold digital-to-analog converter (DAC) 206, a hysteresis comparator 208, and a current modulator 1704.

The conversion circuit 1712 receives a clock signal and a reference signal as analog current signal input from one of the front end circuits 1500. In other examples, more than one front end circuit 1500 can simultaneously provide clock and reference signals as analog current signal input to one back end circuit 1700, which may be done in embodiments in accordance with FIGS. 4, 5, 6, 7, 9, 10, 11, and 14.

Although FIG. 19 illustrates the conversion circuit 1712 coupled to the first clock signal line 1540 and the first reference signal line 1542 as an example, the conversion circuit 1712 may also be coupled to the second clock signal line 1550 and the second reference signal line 1552 or to any other suitable clock signal and reference signal lines. The conversion circuit 1712 converts the analog current signal to an analog differential voltage signal, which is provided to the differential quality booster circuit 310 (for example, through two separate lines coupling the conversion circuit 1712 with the differential quality booster circuit 310).

The differential quality booster circuit 310, threshold digital-to-analog converter (DAC) 206, and hysteresis comparator 208 are configured to work as a capacitive fly height sensor described above with respect to FIGS. 3 and 4, and the details are not repeated therein. Output of the hysteresis comparator 208 is coupled to a current modulator 1704. The hysteresis comparator 208 may be further coupled to a counter 204 (see above, FIG. 3), which is configured to provide output a logic device 410 (see above, FIG. 5) in order to compute a fly height of a disk drive head using the measured capacitance between the disk drive head and the disk.

The current modulator 1704 may be similar to the current source 202 (see above, FIG. 3) and provides output that is coupled to the front end circuits 1500 and the nodes 230 (see above, FIG. 16) to charge and discharge the capacitances between the disk drive heads and the disk. Although FIG. 19 illustrates the current modulator 1704 coupled to the positive feedback current line 1420 and the negative feedback current line 1430 as an example, the current modulator 1704 may also be coupled to the positive feedback current line 1422 and the negative feedback current line 1432 or to any other suitable feedback current lines.

In the illustrated example of FIG. 19, the current modulator 1704 comprises a first variable current source 1714 and a second variable current source 1724. The first variable current source 1714 is coupled between a constant voltage and a switch 1702, which is coupled to the output of the hysteresis comparator 208 and the positive feedback current line 1420. The second variable current source 1724 is coupled between a node coupled to ground and the negative feedback current line 1432. The switch 1702 is used to decouple the first variable current source 1714 (also referred to as a charge current) from the selected disk drive head so that only the second variable current source 1724 (also referred to as a discharge current) remains always coupled to the selected disk drive head. The discharge current is lower than the charge current so that a correct charge profile is maintained on the selected disk drive head (in other words, the capacitor of the selected disk drive head is charged when the switch 1702 is closed and the capacitor of the selected disk drive head is discharged when the switch 1702 is open).

In some embodiments, the first variable current source 1714 or the second variable current source 1724 (including respective variable resistors present in the respective channel dedicated circuits) are replaced by Thevenin equivalent circuits, such as a voltage source in series with a suitable resistor. As such, any respective current or voltage source may be replaced by its dual equivalent voltage or current source, and all such substitutions are within the scope of the disclosed embodiments.

In various embodiments, the charge current and discharge current are selected with a different arrangement of one or more switches. For example, two switches may be present in the path of the charge (positive) current and one switch may be present in the path of the discharge (negative) current. As another example, one switch is present in the path of the discharge (negative) current. As such, any suitable arrangement of one or more switches to select the charge current and discharge current is within the scope of the disclosed embodiments.

Figure 20:
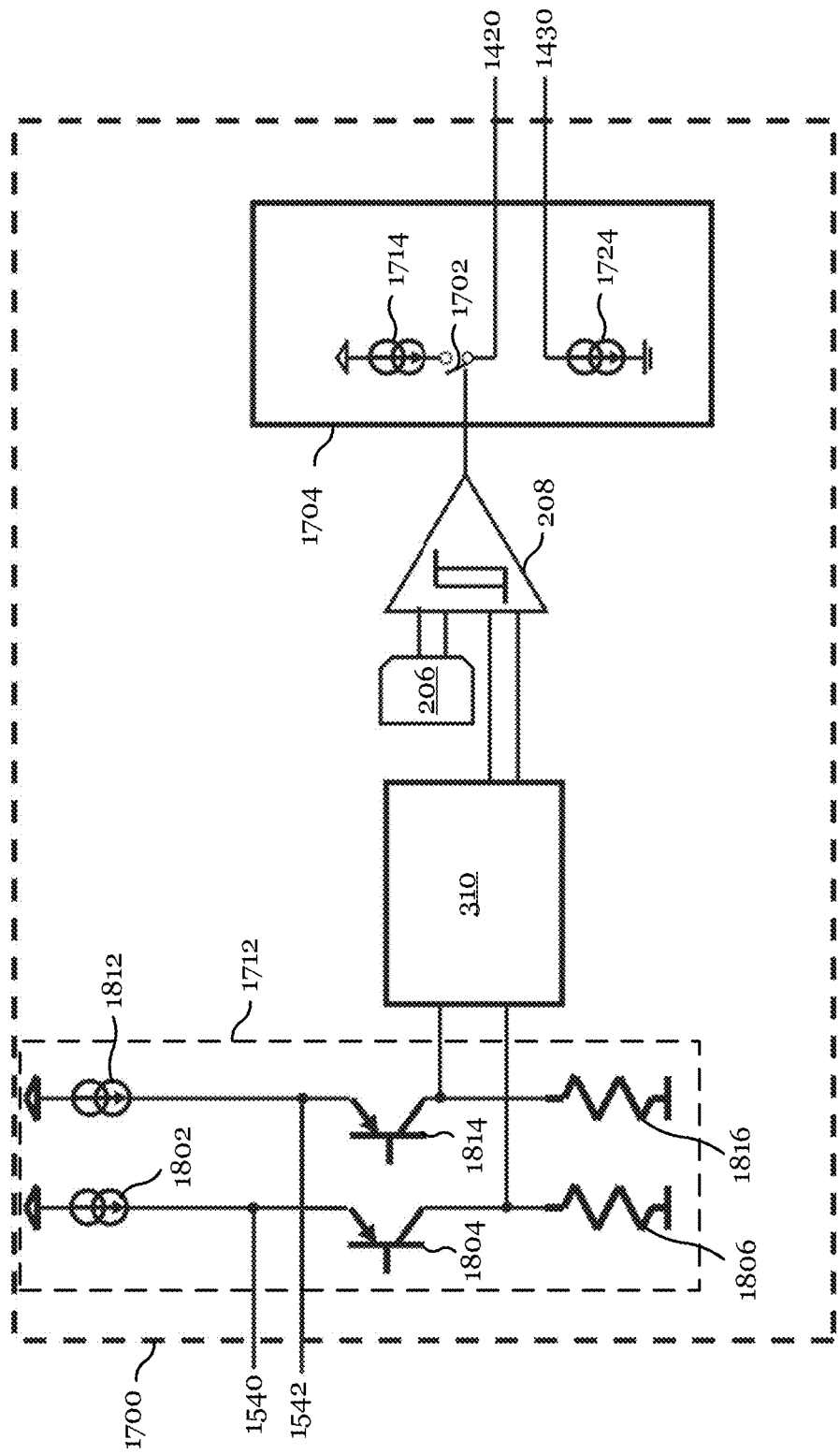
FIG. 20 illustrates another schematic of a back end circuit for capacitive fly height measurement, in accordance with some embodiments.

FIG. 20 illustrates another schematic of an example back end circuit 1700, in accordance with some embodiments. As shown, FIG. 20 illustrates a more detailed diagram of a way to implement the conversion circuit 1712 (illustrated as a block in FIG. 19, above). The remaining components and couplings of the back end circuit 1700 are the same as the components and couplings illustrated above in FIG. 19, and the details are not repeated herein.

As illustrated in the example of FIG. 20, the conversion circuit 1712 comprises a first variable current source 1802, a first transistor 1804, a first resistor 1806, a second variable current source 1812, a second transistor 1814, and a second resistor 1816. The first variable current source 1802 is coupled between a constant voltage and a first terminal of the first transistor 1804, and the first resistor 1806 is coupled between ground and a second terminal of the first transistor 1804. The second variable current source 1812 is coupled between a constant voltage and a first terminal of the second transistor 1814, and the second resistor 1816 is coupled between ground and a second terminal of the second transistor 1814. The first clock signal line 1540 is coupled between the first terminal of the first transistor 1804 and the first variable current source 1802, and the first reference signal line 1542 is coupled between the first terminal of the second transistor 1814 and the second variable current source 1812. A first input of the differential quality booster circuit 310 is coupled between the second terminal of the first transistor 1804 and the first resistor 1806, and a second input of the differential quality booster circuit 310 is coupled between the second terminal of the second transistor 1814 and the second resistor 1816.

Although FIG. 20 illustrates the conversion circuit 1712 comprising a folded cascode structure, in other embodiments a resistive load may be coupled directly to respective nodes of the first clock signal line 1540 and the first reference signal line 1542. Additionally, although the first transistor 1804 and the second transistor 1814 are illustrated as PNP transistors, PMOS devices may also be used for the first transistor 1804 and the second transistor 1814. Furthermore, in embodiments where polarity is reversed, NPN transistors or NMOS devices may be used for the first transistor 1804 and the second transistor 1814.

Figure 21:
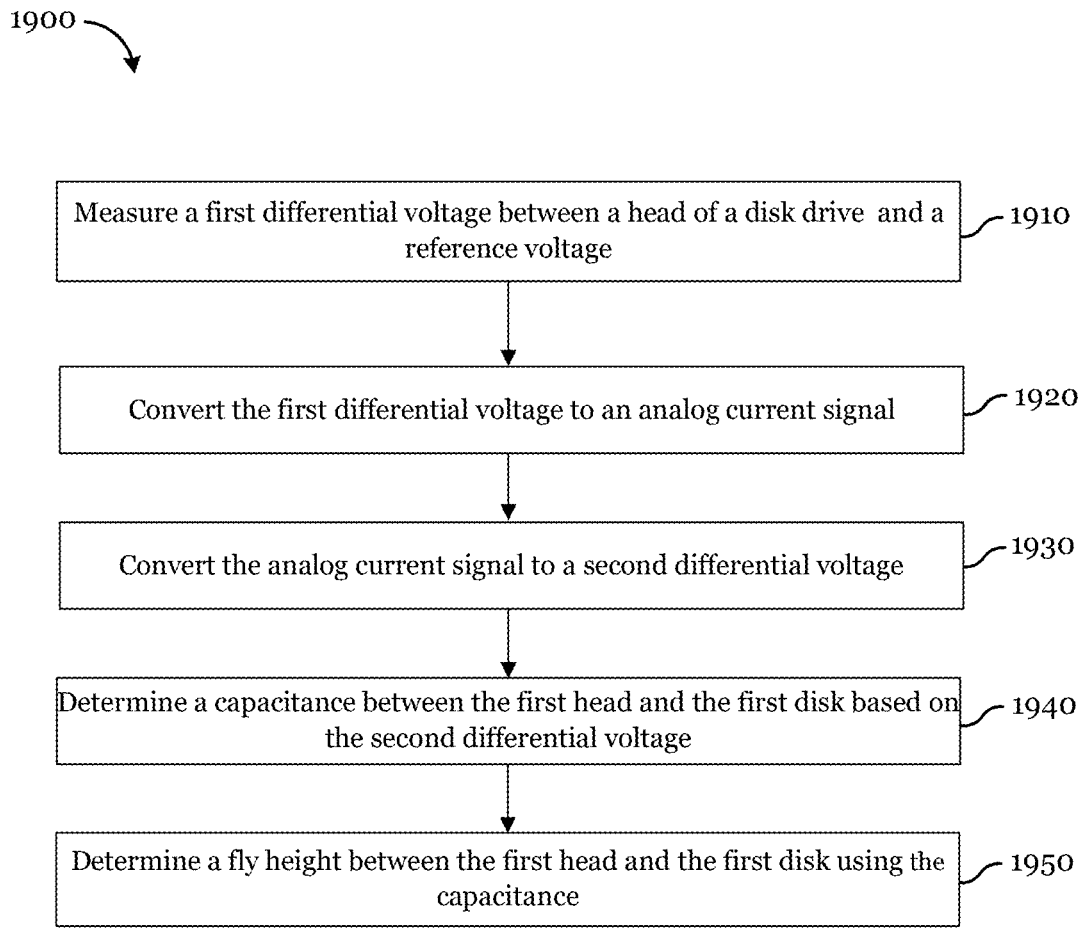
FIG. 21 illustrates a flow chart diagram of an embodiment method for determining a fly height, in accordance with some embodiments.

FIG. 21 illustrates a flow chart diagram of an embodiment method 1900 for determining a fly height, in accordance with some embodiments. In step 1910, a first differential voltage is measured between a first head of a disk drive and a reference voltage with a first front end circuit, as described above with respect to FIG. 16. The first front end circuit is coupled with the first head.

In step 1920, the first differential voltage is converted to a first analog current signal with the first front end circuit, as described above with respect to FIG. 16. In step 1930, the first analog current signal is converted to a second differential voltage with a first back end circuit, as described above with respect to FIG. 18. The first back end circuit is coupled with the first front end circuit.

In step 1940, a first capacitance between the first head and the first disk is determined based on the second differential voltage, as described above with respect to FIGS. 3, 4, and 18. In step 1950, a fly height between the first head and the first disk is determined using the first capacitance, as described above with respect to FIG. 3, 4, 5, 6, or 7.

Example embodiments of the disclosure are summarized here. Other embodiments can also be understood from the entirety of the specification as well as the claims filed herein.

Example 1. A system for determining a fly height, the system including: a first head of a disk drive, the first head being adjacent to a first disk; a first front end circuit coupled to the first head, the first front end circuit being configured to: determine a first differential voltage between the first head and a reference voltage; and convert the first differential voltage to a first analog current signal; a first back end circuit coupled to the first front end circuit, the first back end circuit being configured to: convert the first analog current signal to a second differential voltage; and measure a first capacitance between the first head and the first disk using the second differential voltage; and a logic device coupled to the first back end circuit, the logic device being configured to determine the fly height between the first head and the first disk using the measurement of the first capacitance.

Example 2. The system of example 1, where the first front end circuit includes a first multiplexer, the first multiplexer being coupled to an output terminal of the first back end circuit.

Example 3. The system of one of example 1 or 2, where the first front end circuit includes a first demultiplexer, the first demultiplexer being coupled to an input terminal of the first back end circuit.

Example 4. The system of one of examples 1 to 3, further including: a second head of the disk drive, the second head being adjacent to a second disk; and a second front end circuit coupled to the second head, the second front end circuit being configured to: determine a third differential voltage between the second head and the reference voltage; and convert the third differential voltage to a second analog current signal.

Example 5. The system of one of examples 1 to 4, further including a second back end circuit coupled to the second front end circuit, the second back end circuit being configured to: convert the second analog current signal to a fourth differential voltage; and measure a second capacitance between the second head and the second disk using the fourth differential voltage.

Example 6. The system of one of examples 1 to 5, where the first front end circuit includes an electrostatic discharge protection circuit.

Example 7. The system of one of examples 1 to 6, where the first front end circuit includes a differential voltage to current conversion circuit, where a first terminal of the differential voltage to current conversion circuit is coupled to the first head, and where a second terminal of the differential voltage to current conversion circuit is coupled to a reference voltage line.

Example 8. The system of example 7, where the first terminal of the differential voltage to current conversion circuit is further coupled to the reference voltage line across a resistor.

Example 9. A system for determining a fly height, the system including: a first head of a disk drive, the first head being adjacent to a first disk; a second head of the disk drive, the second head being adjacent to a second disk; a first front end circuit coupled to the first head, the first front end circuit being configured to: determine a first differential voltage between the first head and a reference voltage; and convert the first differential voltage to a first analog current signal; a second front end circuit coupled to the second head, the second front end circuit being configured to: determine a second differential voltage between the second head and the reference voltage; and convert the second differential voltage to a second analog current signal; a first back end circuit coupled to the first front end circuit, the first back end circuit being configured to: convert the first analog current signal to a third differential voltage; and measure a first capacitance between the first head and the first disk using the third differential voltage; a second back end circuit coupled to the second front end circuit, the second back end circuit being configured to: convert the second analog current signal to a fourth differential voltage; and measure a second capacitance between the second head and the second disk using the fourth differential voltage; and a logic device coupled to the first back end circuit and the second back end circuit, the logic device being configured to: correct a measurement of the first capacitance using a measurement of the second capacitance; and determine the fly height between the first head and the first disk using the corrected measurement of the first capacitance.

Example 10. The system of example 9, where the first disk and the second disk are a same disk.

Example 11. The system of one of examples 9 or 10, where the first front end circuit is further coupled to the second back end circuit.

Example 12. The system of one of examples 9 to 11, where the second front end circuit is further coupled to the first back end circuit.

Example 13. The system of one of examples 9 to 12, where the first front end circuit includes a differential voltage to current conversion circuit, a first demultiplexer, and a second demultiplexer, where a first output terminal of the differential voltage to current conversion circuit is coupled to an input terminal of the first demultiplexer, and where a second output terminal of the differential voltage to current conversion circuit is coupled to an input terminal of the second demultiplexer.

Example 14. The system of example 13, where the first demultiplexer is coupled to respective input terminals of the first back end circuit and the second back end circuit, and where the second demultiplexer is coupled to respective input terminals of the first back end circuit and the second back end circuit.

Example 15. A method for measuring a fly height, the method including: measuring a first differential voltage between a first head of a disk drive and a reference voltage with a first front end circuit, the first front end circuit being coupled with the first head; converting the first differential voltage to a first analog current signal with the first front end circuit; converting the first analog current signal to a second differential voltage with a first back end circuit, the first back end circuit being coupled with the first front end circuit; determining a first capacitance between the first head and a first disk of the disk drive based on the second differential voltage; and determining the fly height between the first head and the first disk using the first capacitance.

Example 16. The method of example 15, further including: measuring a second differential voltage between a second head of the disk drive and the reference voltage with a second front end circuit, the second front end circuit being coupled with the second head; and converting the second differential voltage to a second analog current signal with the second front end circuit.

Example 17. The method of example 16, further including converting the first analog current signal to a third differential voltage with a second back end circuit, the second back end circuit being coupled with the second front end circuit.

Example 18. The method of example 17, further including determining a second capacitance between the second head and a second disk of the disk drive based on the third differential voltage.

Example 19. The method of example 18, where determining the fly height between the first head and the first disk further includes correcting a measurement of the first capacitance using a measurement of the second capacitance.

Example 20. The method of one of examples 15 to 20, further including opening a switch of the first back end circuit, where the switch is coupled between a comparator of the first back end circuit and a line coupled to the first front end circuit.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A system for determining a fly height, the system comprising:
   a first front end circuit coupled to a head of a disk drive, the first front end circuit being configured to produce a first analog current signal;
   a first back end circuit coupled to the first front end circuit, the first back end circuit being configured to measure a first capacitance between the head and a disk of the disk drive using the first analog current signal; and
   a logic device coupled to the first back end circuit, the logic device being configured to determine the fly height of the head using the measurement of the first capacitance.

2. The system of claim 1, wherein the first back end circuit comprises a conversion circuit, a comparator coupled with the conversion circuit at a first input of the comparator, and a current modulator coupled with an output of the comparator.

3. The system of claim 2, wherein the first back end circuit further comprises a digital-to-analog converter (DAC) coupled with the comparator at a second input of the comparator.

4. The system of claim 2, wherein the conversion circuit is configured to receive a clock signal and a reference signal as analog current signal input from the first front end circuit.

5. The system of claim 2, wherein the conversion circuit comprises a folded cascode structure.

6. The system of claim 2, wherein the first back end circuit further comprises a quality booster circuit coupled between the conversion circuit and the comparator.

7. The system of claim 2, wherein the current modulator comprises a first variable current source switchably coupled with the head of the disk drive.

8. The system of claim 7, wherein the current modulator comprises a second variable current source fixedly coupled with the head of the disk drive.

9. A system for determining a fly height, the system comprising:
   a first front end circuit coupled to a head of a disk drive, the first front end circuit comprising a selection circuit and a conversion circuit coupled to the selection circuit, the first front end circuit being configured to:
      determine a first differential voltage between the head and a reference voltage; and
      convert the first differential voltage to a first analog current signal with the conversion circuit;
   a first back end circuit coupled to the first front end circuit, the first back end circuit being configured to:
      convert the first analog current signal to a second differential voltage; and
      measure a first capacitance between the head and a disk of the disk drive using the second differential voltage; and
   a logic device coupled to the first back end circuit, the logic device being configured to determine the fly height between the head and the disk using the measurement of the first capacitance.

10. The system of claim 9, wherein the selection circuit comprises a pair of coupled transistors.

11. The system of claim 10, wherein the coupled transistors are MOS devices.

12. The system of claim 9, wherein the selection circuit is configured to select a back end circuit with which to exchange input and output analog current signals.

13. The system of claim 9, wherein the selection circuit is further coupled to a second back end circuit.

14. The system of claim 9, wherein the conversion circuit comprises a pair of transistors coupled across a resistor.

15. The system of claim 14, wherein the pair of transistors are bipolar junction transistors.

16. The system of claim 9, wherein the first front end circuit further comprises a variable resistor coupled between the selection circuit and a common mode voltage line.

17. The system of claim 16, wherein the variable resistor comprises a plurality of resistors coupled to the common mode voltage line across respective transistors.

18. A system for determining a fly height, the system comprising:
   a first front end circuit coupled to a first head of a disk drive, the first front end circuit being configured to produce a first analog current signal;
   a second front end circuit coupled to a second head of the disk drive, the second front end circuit being configured to produce a second analog current signal;
   a first back end circuit coupled to the first front end circuit, the first back end circuit being configured to measure a first capacitance between the first head and a first disk of the disk drive using the first analog current signal;

a second back end circuit coupled to the second front end circuit, the second back end circuit being configured to measure a second capacitance between the second head and a second disk of the disk drive using the second analog current signal; and a logic device coupled to the first back end circuit and the second back end circuit, the logic device being configured to:

correct a measurement of the first capacitance using the measurement of the second capacitance; and determine the fly height between the first head and the first disk using the corrected measurement of the first capacitance.

19. The system of claim 18, wherein the first front end circuit is further coupled to the second back end circuit.

20. The system of claim 18, wherein the second front end circuit is further coupled to the first back end circuit.

\* \* \* \* \*